US012462565B2

(12) United States Patent
Moteki

(10) Patent No.: US 12,462,565 B2
(45) Date of Patent: Nov. 4, 2025

(54) COMPUTER-READABLE RECORDING MEDIUM, ESTIMATION METHOD, AND ESTIMATION DEVICE

(71) Applicant: FUJITSU LIMITED, Kawasaki (JP)

(72) Inventor: Atsunori Moteki, Inagi (JP)

(73) Assignee: FUJITSU LIMITED, Kawasaki (JP)

( * ) Notice: Subject to any disclaimer, the term of this patent is extended or adjusted under 35 U.S.C. 154(b) by 487 days.

(21) Appl. No.: 17/891,546

(22) Filed: Aug. 19, 2022

(65) Prior Publication Data

US 2023/0094892 A1 Mar. 30, 2023

(30) Foreign Application Priority Data

Sep. 29, 2021 (JP) .................................. 2021-159861

(51) Int. Cl.
*G06V 20/52* (2022.01)
*G06T 7/246* (2017.01)
*G06T 7/60* (2017.01)
*G06V 10/26* (2022.01)
*G06V 10/77* (2022.01)
(Continued)

(52) U.S. Cl.
CPC .............. *G06V 20/52* (2022.01); *G06T 7/251* (2017.01); *G06T 7/60* (2013.01); *G06V 10/26* (2022.01); *G06V 10/7715* (2022.01); *G06V 20/64* (2022.01); *G06V 40/20* (2022.01)

(58) Field of Classification Search
CPC ........ G06V 20/52; G06V 20/64; G06V 40/20; G06V 40/28; G06V 40/23; G06V 20/44; G06V 20/58; G06V 10/26; G06V 10/7715; G06V 20/46; G06V 40/168; G06V 10/82; G06Q 30/0185; G06Q 30/0609; G06T 2207/10016; G06T 7/251; G06T 7/60; G06T 2207/10004; G06T 7/75; G06T 7/70; G06T 2207/20084; G06T 2207/20081
See application file for complete search history.

(56) References Cited

U.S. PATENT DOCUMENTS

| 2012/0308140 | A1 | 12/2012 | Ambrus et al. |
| 2013/0182114 | A1 | 7/2013 | Zhang et al. |
| 2018/0189763 | A1* | 7/2018 | Olmstead ............... G06V 10/42 |

(Continued)

FOREIGN PATENT DOCUMENTS

| JP | 2014-524071 | 9/2014 |
| JP | 2020-173816 | 10/2020 |

OTHER PUBLICATIONS

Extended European Search Report dated Feb. 14, 2023 for European Application No. 22191674.5, 10 pages.
(Continued)

*Primary Examiner* — Sumati Lefkowitz
*Assistant Examiner* — Anna Lei
(74) *Attorney, Agent, or Firm* — STAAS & HALSEY LLP

(57) ABSTRACT

A non-transitory computer-readable recording medium stores therein an estimation program that causes a computer to execute a process including, identifying a first person who uses a first cart from a first image acquired by capturing inside a store, generating skeleton information of the first person, acquiring, by using the skeleton information, a first space in which the first person grasps a grip part of the first cart, and estimating a first scale of the first person based on the first space and length information of the first cart.

17 Claims, 21 Drawing Sheets

(51) Int. Cl.
    *G06V 20/64*     (2022.01)
    *G06V 40/20*     (2022.01)

(56) References Cited

U.S. PATENT DOCUMENTS

| | | | |
|---|---|---|---|
| 2019/0005786 A1* | 1/2019 | Uchida | G08B 13/19608 |
| 2019/0108396 A1* | 4/2019 | Dal Mutto | G06V 20/52 |
| 2019/0156506 A1* | 5/2019 | Fisher | G06T 7/70 |
| 2019/0188876 A1* | 6/2019 | Song | G06K 7/10425 |
| 2020/0020112 A1* | 1/2020 | Buibas | G01G 19/4144 |
| 2020/0118401 A1* | 4/2020 | Zalewski | G07G 1/0072 |

OTHER PUBLICATIONS

Xiaochen Liu et al: "Grab: Fast and Accurate Sensor Processing for Cashier-Free Shopping", Arxiv.org, Cornell University Library, 201 Olin Library Cornell University Ithaca, NY 14853, Jan. 4, 2020.
Dey Ayon: "Machine Learning Algorithms: a Review", International Journal of Computer Science and Information Technologies, vol. 7, No. 3, May 3, 2016.

* cited by examiner

COMPUTER-READABLE RECORDING MEDIUM, ESTIMATION METHOD, AND ESTIMATION DEVICE

CROSS-REFERENCE TO RELATED APPLICATION(S)

This application is based upon and claims the benefit of priority of the prior Japanese Patent Application No. 2021-159861, filed on Sep. 29, 2021, the entire contents of which are incorporated herein by reference.

FIELD

The embodiments discussed herein are related to a computer-readable recording medium, an estimation method, and an estimation device.

BACKGROUND

In order to relieve congestion at checkout counters, retailers are increasingly introducing systems with which customers scan and register items, and make payment for items by themselves. More recently, there has also been an introduction of a system that allows customers to scan items at locations other than the checkout counters, such as on the sales area where each item is picked up, for example, by using an application installed on terminals rented in retail stores or on terminals owned by the customers themselves. In such a system where customers themselves scan the items, it is important to correctly recognize and detect the behaviors of the customers, such as picking up items and putting them in the shopping cart and scanning the items, in order to detect fraudulent behaviors such as shoplifting. Note here that a shopping cart may simply be referred to as a "cart".

Meanwhile, as a system that detects fraudulent behaviors of the customers in retail stores, there is also a developed system that detects suspicious behaviors of customers as well as fraudulent behaviors such as shoplifting by using in-store surveillance cameras, for example. The related technologies are described, for example, in: Japanese National Publication of International Patent Application No. 2014-524071; Japanese Laid-open Patent Publication No. 2020-173816; and U.S. Patent Application Publication No. 2020/0118401.

SUMMARY

According to an aspect of an embodiment, a non-transitory computer-readable recording medium stores therein an estimation program that causes a computer to execute a process including, identifying a first person who uses a first cart from a first image acquired by capturing inside a store, generating skeleton information of the first person, acquiring, by using the skeleton information, a first space in which the first person grasps a grip part of the first cart, and estimating a first scale of the first person based on the first space and length information of the first cart.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT(S)

However, since the videos (strictly speaking, images) captured by surveillance cameras are two-dimensional images, it is not possible for a fraud detection system to estimate the scale of a person when the positional relationship between the person and the cart is unknown. Therefore, in some cases, it is not possible with the fraud detection system to correctly recognize the behavior of the person from the images captured by the surveillance cameras.

Accordingly, it is an object in one aspect of an embodiment of the present invention to provide an estimation program, an estimation method, and an estimation device capable of more accurately estimating the scale of a person from captured images.

Preferred embodiments of the present invention will be explained with reference to accompanying drawings. Note that the embodiment discussed herein is not limited by the examples. Each of the examples may also be combined as appropriate to the extent that there is no contradiction.

Example 1

Figure 1:
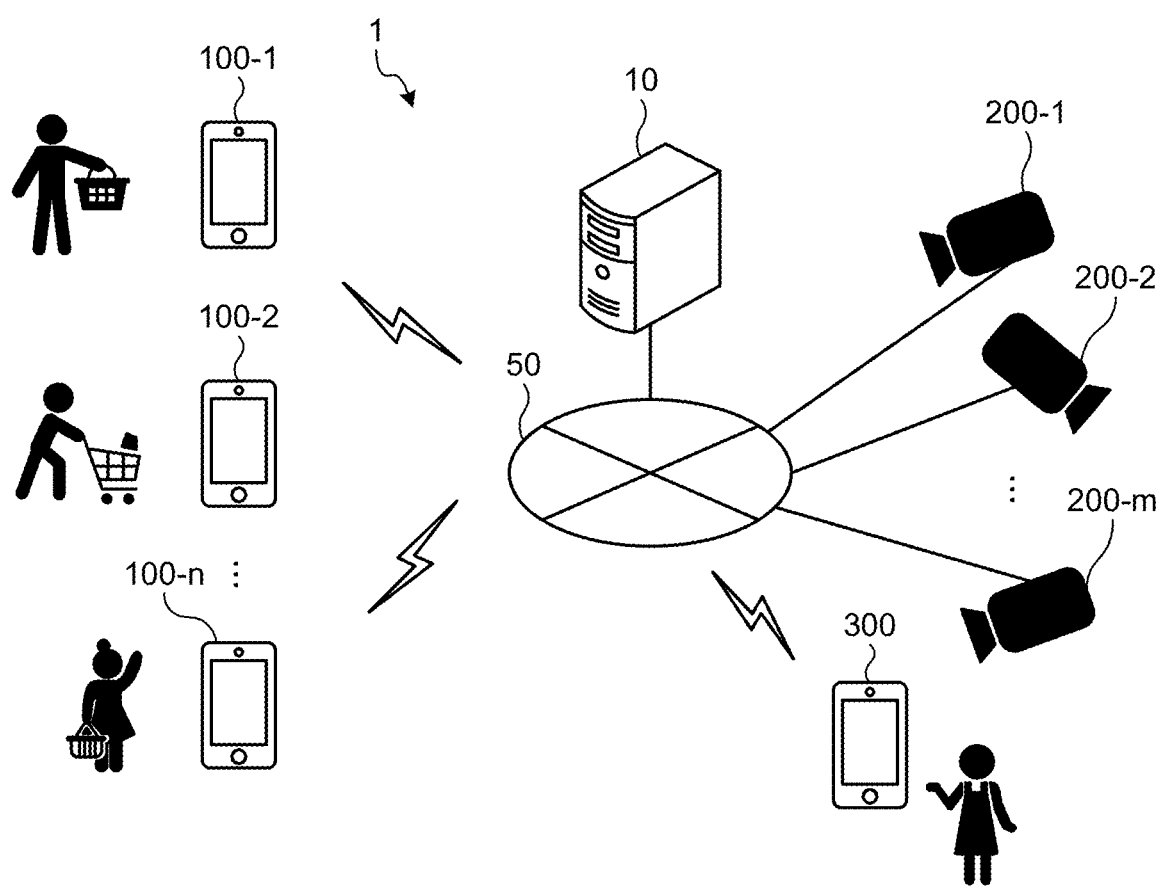
FIG. 1 is a diagram illustrating a configuration example of a fraud detection system according to Example 1.

First, a fraud detection system for implementing the present embodiment will be described. FIG. 1 is a diagram illustrating a configuration example of the fraud detection system according to Example 1. As illustrated in FIG. 1, a fraud detection system 1 includes an estimation device 10 and user terminals 100-1 to 100-$n$ ($n$ is an arbitrary integer, and collectively referred to as "user terminal 100" hereinafter) communicably connected to each other via a network 50.

Furthermore, the estimation device 10 is connected to camera devices 200-1 to 200-$m$ ($m$ is an arbitrary integer, and collectively referred to as "camera device 200" hereinafter) and a clerk terminal 300 to be able to communicate with each other via the network 50.

As for the network 50, it is possible to employ various communication networks, whether wired or wireless, such as an intranet used in a retail store, for example. Furthermore, the network 50 may be configured not with a single network, but with an intranet and the Internet via a network device such as a gateway or other devices (not illustrated), for example. Note that "in the retail store" is not limited to indoor areas, but may also include outdoor areas on the premises.

The estimation device 10 is an information processing device such as a desktop personal computer (PC), a notebook PC, or a server computer installed in a retail store and used by store staff or a manager, for example.

The estimation device 10 receives, from the camera devices 200, a plurality of images of a prescribed imaging range such as inside the retail store and the premises captured by the camera devices 200. Note that the images are, strictly speaking, videos captured by the camera device 200, that is, a series of frames of moving images.

Furthermore, the estimation device 10 uses an existing object detection technology to identify, from the captured images, a customer staying in the store (may simply be referred to as "person" hereinafter), a shopping basket (may simply be referred to as "basket" hereinafter) or a shopping cart held by the person, and the user terminal 100. Furthermore, the estimation device 10 uses an existing skeleton detection technology to generate skeleton information of the person identified from the captured image to estimate the position, pose, and scale of the person, and detects an action such as grasping the cart, putting items into a basket or cart, and the like. Note here that the scale is a measure of the height of a person, for example, and the estimation device 10 estimates the scale of various persons in the captured images based on length information of the carts and the like caught in the captured images. This allows the estimation device 10 to estimate the positional relationship between the person and the cart, for example, based on the scale of the person, thereby making it possible to improve the accuracy in behavior recognition of the person.

While the estimation device 10 is illustrated as a single computer in FIG. 1, it may also be a distributed computing system configured with a plurality of computers. The estimation device 10 may also be a cloud computer device managed by a service provider that offers cloud computing services.

The user terminal 100 is an information processing terminal with which the customer oneself scans a barcode or the like on an item to register the purchased item in order to purchase the item. The user terminal 100 may be a mobile terminal such as a smartphone or tablet personal computer (PC) owned by the customer, or may be a dedicated terminal rented in the store. The user terminal 100 has an application for scanning and registering items, for example, installed in advance.

The camera device 200 is a surveillance camera installed in the retail store or on the premises, for example. While a plurality of camera devices 200 are illustrated in FIG. 1, there may be a single camera device in the case of a small store or the like, for example. The videos captured by the camera device 200 are transmitted to the estimation device 10.

The clerk terminal 300 may be a mobile terminal such as a smartphone or tablet PC owned by a clerk of the retail store, or may be an information processing device such as a desktop PC or a notebook PC placed at a prescribed location in the store. The clerk terminal 300 receives an alert from the estimation device 10, when the estimation device 10 detects a fraudulent behavior of the customer, such as omitting scanning an item. While there may be a plurality of clerk terminals 300 one each for the clerks in the store, for example, the terminal to which the alert is notified may be limited to the terminal held by the clerk in charge of security near the exit, for example.

Figure 2:
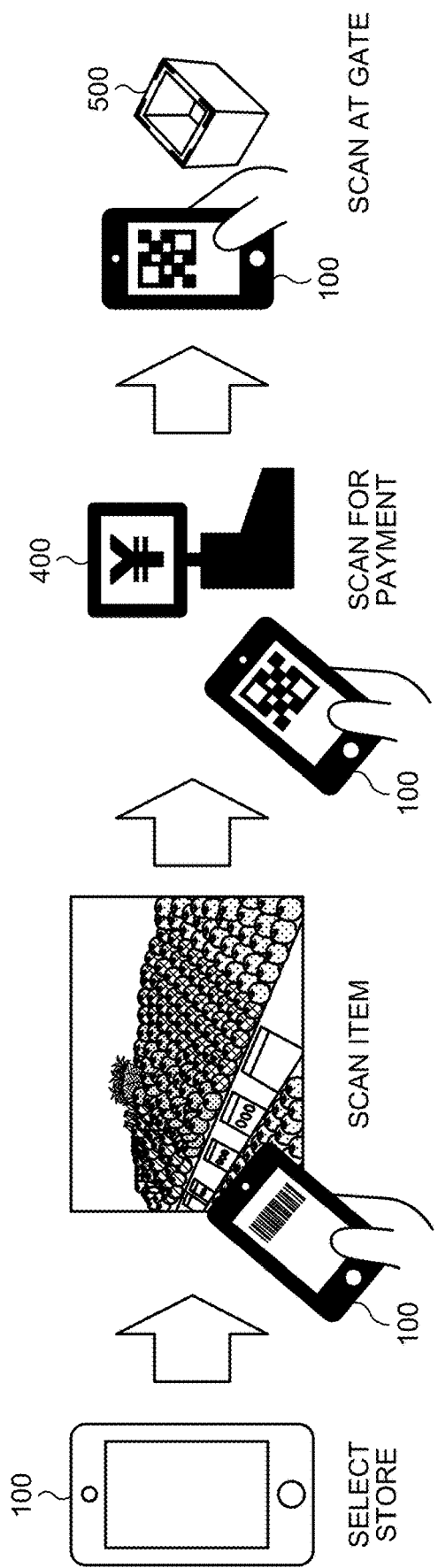
FIG. 2 is a diagram illustrating an example when purchasing an item by self-scanning according to Example 1.

Next, by referring to FIG. 2 and FIG. 3, how the customer oneself scans and registers an item (may sometimes referred to as "self-scanning" hereinafter) and purchases the item will be described. FIG. 2 is a diagram illustrating an example when purchasing an item by self-scanning according to Example 1.

As illustrated in FIG. 2, first, the customer selects the visited store via an application displayed on the user terminal 100. Then, the customer takes an item to be purchased and reads the barcode or the like of each item attached to the item, a shelf, or the like, for example, by using the user terminal 100 (may sometimes be referred to as "item scanning" hereinafter). Thereby, the item to be purchased is registered in the application.

The customer then scans a payment code that is displayed on a display unit of a self-checkout terminal 400 or the like. Then, by paying the amount displayed on a settlement screen of the self-checkout terminal 400, purchase of the item is completed. Furthermore, the customer can also exit the store by having a payment completion code displayed on the user terminal 100 read by a gate reader 500 placed at the exit of the store or the like. Although not illustrated in FIG. 1, the self-checkout terminal 400 and the gate reader 500 are connected to the estimation device 10 to be communicable with each other via the network 50.

Next, another example when purchasing an item by self-scanning will be described. FIG. 3 is a diagram illustrating another example when purchasing an item by self-scanning according to Example 1.

Figure 3:
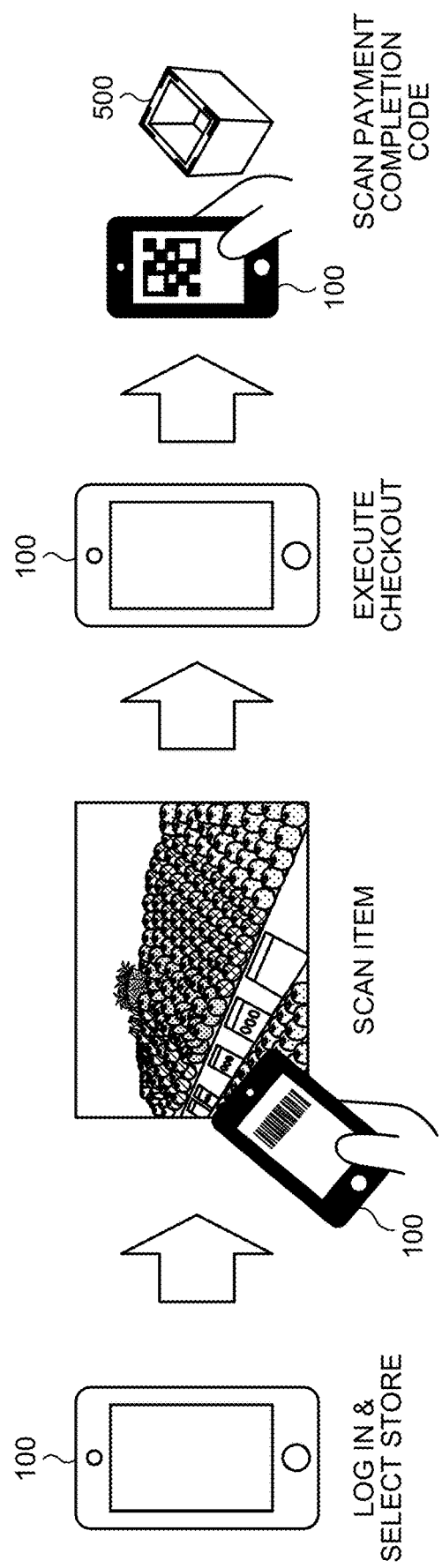
FIG. 3 is a diagram illustrating another example when purchasing an item by self-scanning according to Example 1.

As illustrated in FIG. 3, first, the customer logs into the application displayed on the user terminal 100, and selects the visited store. Then, the customer takes an item to be purchased and reads the barcode or the like of each item attached to the item to be purchased, the shelf, or the like, for example, by using the user terminal 100.

The customer then places the basket containing the purchased item at a checkpoint in the store and presses "checkout button" or "purchase button" displayed on the user terminal 100 to check out the item to be purchased. Note that payment for the purchased item can be made by electronic money, a credit card, or the like via the application displayed on the user terminal 100. The customer can then exit the store by having the payment completion code displayed on the user terminal 100 read by the gate reader 500 or the like placed at the exit of the store or the like.

Purchased items by self-scanning has been described heretofore by referring to FIG. 2 and FIG. 3. However, with self-scanning, customers may be able to put items in their baskets without scanning them and avoid payment without going through the self-checkout counter, for example. Alternatively, customers may scan only some of the items to be purchased, and check out only the scanned items at the self-checkout counter, thereby avoiding payment for the rest of the items. In particular, it is easy for the clerks or the like to detect fraudulent behaviors when the number of items is small, but it is difficult for the clerks or the like to detect such behaviors when the number of items is large and some of the items are not scanned, for example. Therefore, the fraud detection system recognizes behaviors of the customers from the videos captured by the camera device 200 and detects the fraudulent behavior. Fraud detection processing executed by the fraud detection system will be described.

Figure 4:
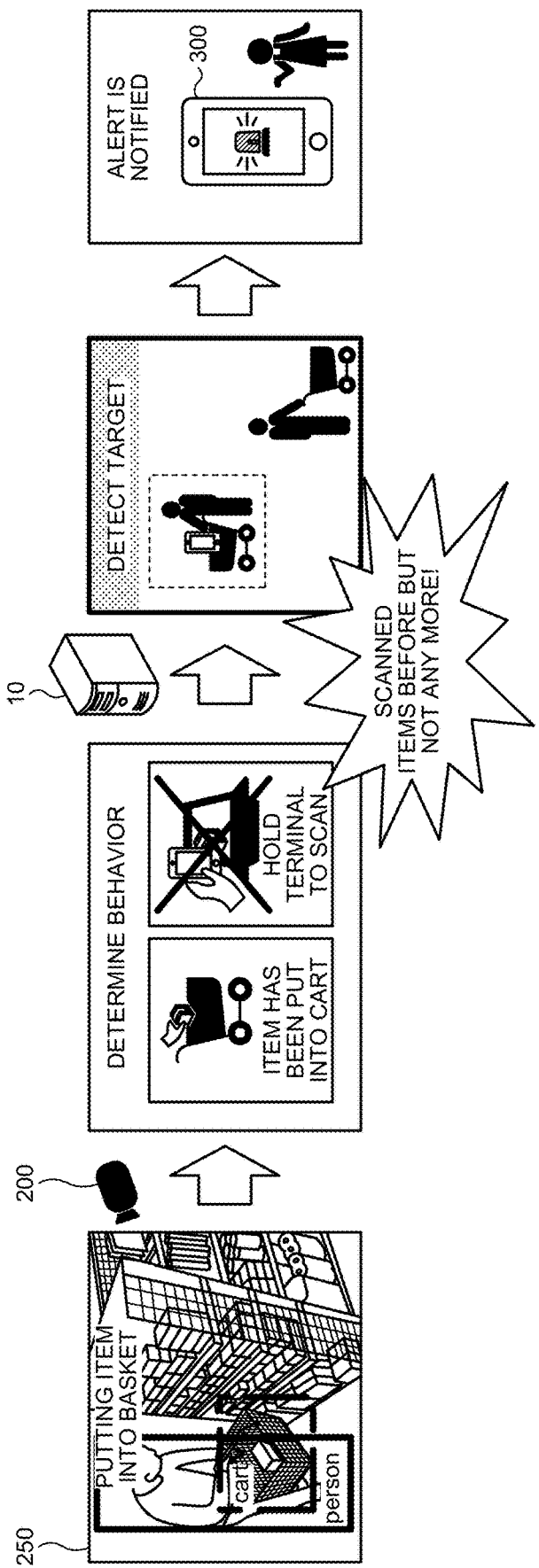
FIG. 4 is a diagram illustrating an example of fraud detection processing according to Example 1.

FIG. 4 is a diagram illustrating an example of the fraud detection processing according to Example 1. A captured image 250 illustrated in FIG. 4 is an example of captured images acquired in a retail store by the camera device 200. The estimation device 10 identifies persons and objects from the captured image 250. Then, based on the person, the cart, and the like identified from the captured image 250, the estimation device 10 determines the behavior of the person, such as whether the person has put an item into the cart and scanned the item, for example. The estimation device 10 then detects the person acting improperly, such as omitting scanning the item, as the target and notifies the clerk terminal 300 of the alert.

Figure 5:
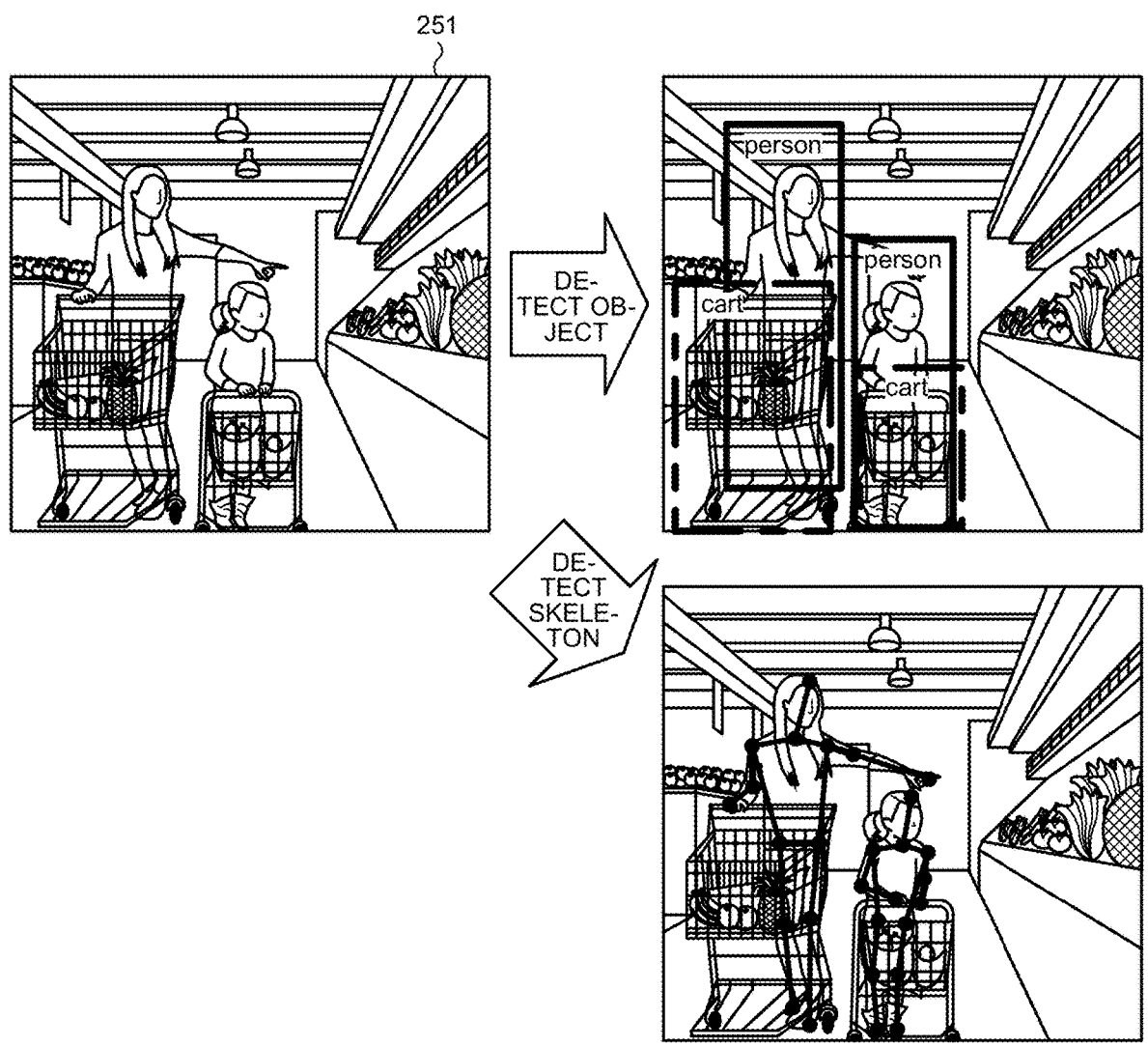
FIG. 5 is a diagram illustrating an example of object detection and skeleton detection according to Example 1.

Here, a method of identifying persons and objects from a captured image will be described in a specific manner by referring to FIG. 5. FIG. 5 is a diagram illustrating an example of object detection and skeleton detection according to Example 1. As illustrated in the upper right corner of FIG. 5, the estimation device 10 detects and identifies a person (person) and a cart (cart) from a captured image 251 by using, for example, an existing object detection algorithm. Note here that an existing object detection algorithm is an object detection algorithm using deep learning such as faster R-convolutional neural network (CNN), for example. It may also be an object detection algorithm such as you only look once (YOLO) or single shot multibox detector (SSD).

In addition to persons and baskets, for example, items, the user terminal 100, sales areas of items such as aisles and shelves of the items, clothing of the persons, and the like may also be detected from the captured images. This allows the estimation device 10 to detect when there is no self-scanning performed even though the person carries the user terminal 100, for example. The estimation device 10 can also determine the age of the persons identified from the captured image and identify a group relationship between the persons, such as a parent-child relationship, by using the existing algorithms, for example. Thereby, in the case of a parent-child relationship, for example, it may be determined that there is no scanning omission of items if either one of subject persons performs scanning of the items.

Furthermore, as illustrated in the lower right corner of FIG. 5, the estimation device 10 detects the skeletons of the persons identified from the captured image 251 by using, for example, an existing skeleton estimation algorithm. Note here that existing skeleton estimation algorithms are skeleton estimation algorithms that use deep learning such as HumanPoseEstimation like DeepPose and OpenPose, for example.

Figure 6:
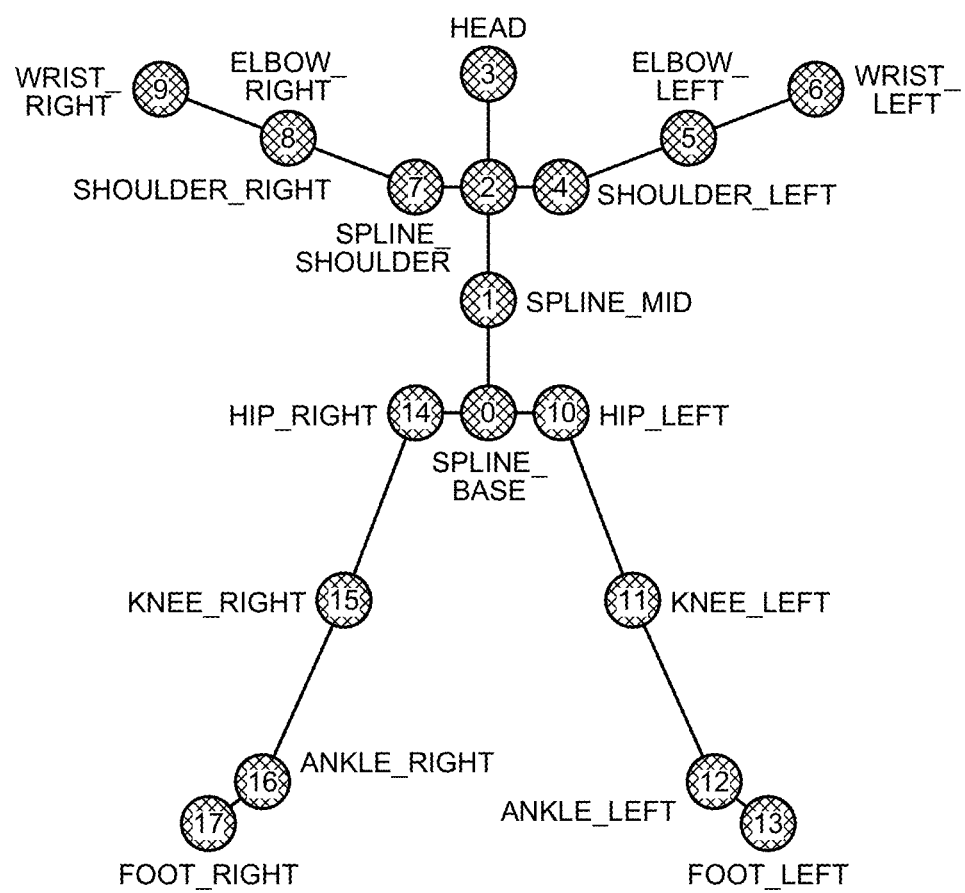
FIG. 6 is a diagram illustrating an example of skeleton information.

For example, the estimation device 10 acquires skeleton information by inputting image data (each frame) into a trained machine learning model. FIG. 6 is a diagram illustrating an example of the skeleton information. As for the skeleton information, it is possible to use 18 pieces (numbered from 0 to 17) of definition information, in which each joint identified in a known skeleton model is numbered. For example, "7" is assigned to the right shoulder joint (SHOULDER_RIGHT), "5" is assigned to the left elbow joint (ELBOW_LEFT), "11" is assigned to the left knee joint (KNEE_LEFT), and "14" is assigned to the right hip joint (HIP_RIGHT). Therefore, the estimation device 10 can acquire the coordinate information of the skeleton with 18 sections illustrated in FIG. 6 from the image data. For example, the estimation device 10 acquires "X coordinate=X7, Y coordinate=Y7, Z coordinate=Z7" as the position of the right shoulder joint that is numbered "7". For example, the Z axis may be defined as the direction of distance from the imaging device toward the object, the Y axis may be defined as the height direction perpendicular to the Z axis, and the X axis may be defined as the horizontal direction.

Figure 7:
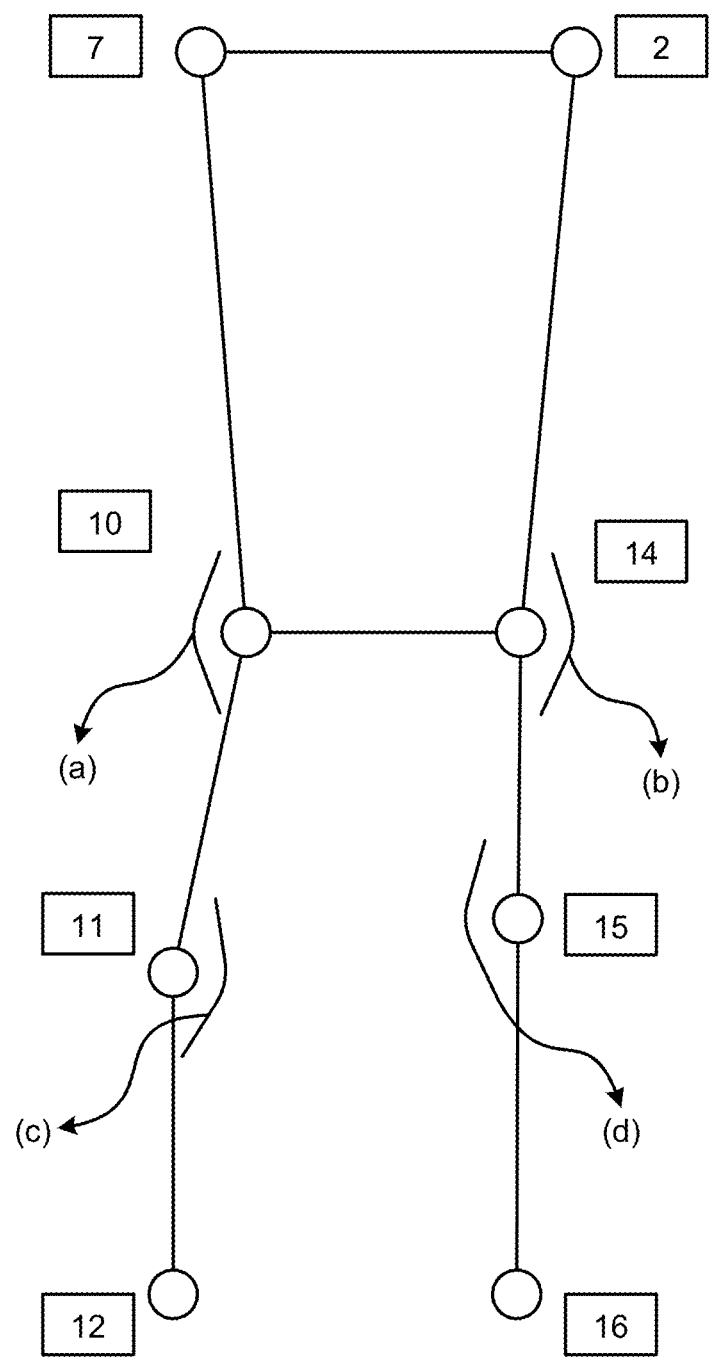
FIG. 7 is a diagram for describing determination of a whole-body pose.

The estimation device 10 can also determine the pose of the whole body, such as standing, walking, squatting, sitting, and lying down, by using a machine learning model that is trained in advance on skeleton patterns in advance. For example, the estimation device 10 can also determine the closest whole-body pose by using a machine learning model trained with Multi Layer Perceptron for some joints and angles between joints, such as the skeleton information in FIG. 6 and an aesthetic diagram. FIG. 7 is a diagram for describing determination of the whole-body pose. As illustrated in FIG. 7, the estimation device 10 can detect whole body pose by acquiring a joint angle (a) between "HIP_LEFT" numbered "10" and "KNEE_LEFT" numbered "11", a joint angle (b) between "HIP_RIGHT" numbered "14" and "KNEE_RIGHT" numbered "15", an angle (c) of "KNEE_LEFT" numbered "11", an angle (d) of "KNEE_RIGHT" numbered "15", and the like.

Furthermore, the estimation device 10 may estimate the pose by using a machine learning model such as Multi Layer Perceptron generated by machine learning based on some joints and angles between the joints as feature values and poses of the whole body such as standing and squatting as correct labels.

The estimation device 10 may also use, as a pose estimation algorithm, 3D Pose Estimation such as VNect that estimates three-dimensional poses from a single captured image. The estimation device 10 may also estimate the pose from three-dimensional joint data by using, for example, a 3d-pose-baseline that generates three-dimensional joint data from two-dimensional skeleton information.

Furthermore, the estimation device 10 may estimate the pose of the person by identifying the action of each body part of the person based on the orientation of each body part of the person, such as the face, arm, or elbow, as well as the angle thereof when bent, and the like. Note that the algorithm for pose estimation and skeleton estimation is not limited to one kind, but a plurality of algorithms may be used to estimate the pose and the skeleton in a comprehensive manner.

However, since the captured image acquired by the camera device 200 is a two-dimensional image, when the positional relationship between the person and the cart is unknown, it is not possible for the estimation device 10 to estimate the scale of the person and to correctly recognize the behavior of the person from the captured image.

Figure 8:
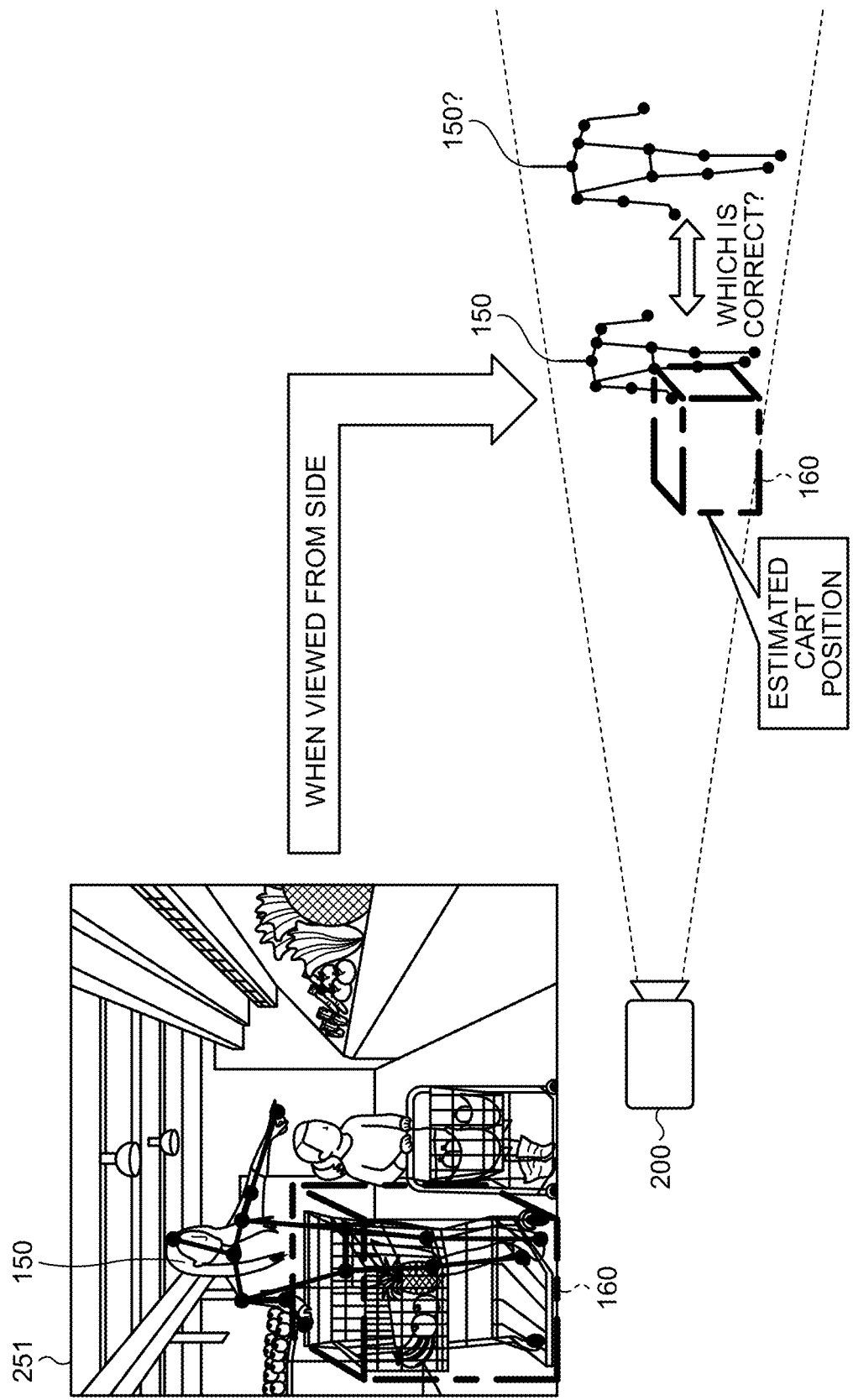
FIG. 8 is a diagram for describing problems when recognizing behaviors from a captured image.

FIG. 8 is a diagram for describing problems when recognizing the behaviors from the captured image. As illustrated in FIG. 8, when a person 150 and a cart 160 are caught in the captured image 251 while being overlapped, for example, the positional relationship between the person 150 and the cart 160 is unknown, so that whether the person 150 is grasping the cart 160 may sometimes be recognized incorrectly. That is, assuming a case of viewing from the side with the imaging direction of the captured image 251 being the front, it is not possible in some cases to correctly recognize whether the person 150 is right behind the cart 160 or far behind the cart 160 from the captured image, as illustrated in the lower part of FIG. 8.

Here, since information regarding the length of the cart 160 handled in the store is known in advance and can be held in the estimation device 10, the estimation device 10 can estimate the positional relationship between the person 150 and the cart 160 if the scale of the person 150 is known. Therefore, it is one of the objects of the present embodiment to more accurately estimate the scale of the person from the captured image acquired by the camera device 200 in the retail store and on the premises and, consequently, to more accurately recognize the behavior of the person.

Functional Configuration of Estimation Device 10

Figure 9:
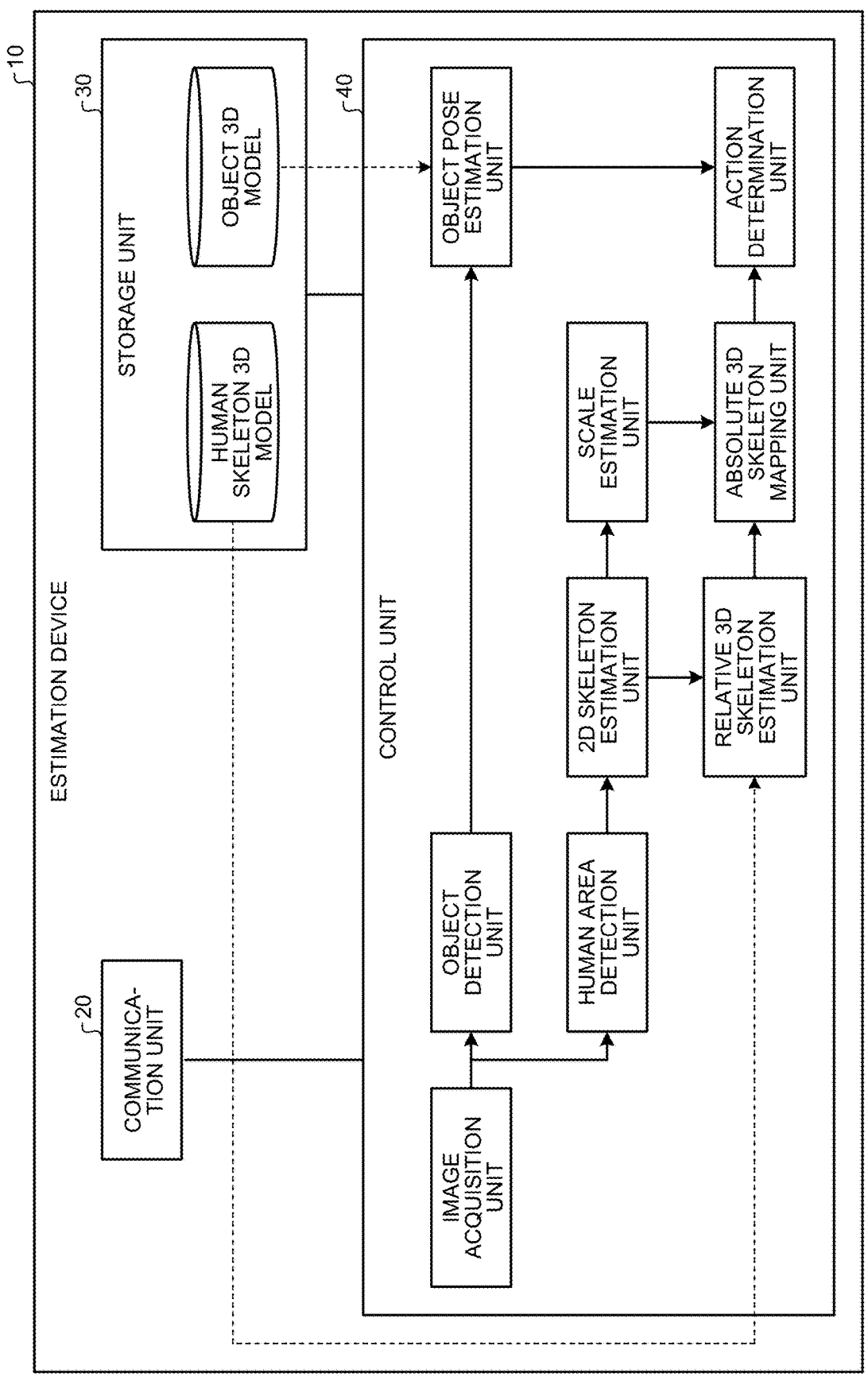
FIG. 9 is a diagram illustrating a configuration example of an estimation device 10 according to Example 1.

Next, the functional configuration of the estimation device 10 to be the main actor of the present embodiment will be described. FIG. 9 is a diagram illustrating a configuration example of the estimation device 10 according to Example 1. As illustrated in FIG. 9, the estimation device 10 includes a communication unit 20, a storage unit 30, and a control unit 40.

The communication unit 20 is a processing unit that controls communication with other devices such as the user terminal 100 and the camera device 200, and it is a communication interface such as a universal serial bus (USB) interface or a network interface card, for example.

The storage unit 30 has a function of storing therein various kinds of data and computer programs to be executed by the control unit 40, and it is achieved by a storage device such as by a memory or a hard disk, for example. For example, the storage unit 30 stores therein a human skeleton 3D model for estimating three-dimensional skeleton information of a person, an object 3D model for estimating the pose of an object, and the like.

The storage unit 30 stores therein a plurality of captured images, which are a series of frames captured by the camera device 200. Furthermore, the storage unit 30 can store therein positional information in the image regarding the person and the object identified for the captured image. The storage unit 30 also stores therein the two-dimensional skeleton information of the person identified from the captured images acquired by the camera device 200. The storage unit 30 also stores therein the length information of the cart, such as the length of the grip part of the cart.

The above information stored in the storage unit 30 is only an example, and the storage unit 30 can store therein various kinds of other information in addition to the information described above.

The control unit 40 is a processing unit that controls the entire estimation device 10, and it is a processor or the like, for example. The control unit 40 includes an image acquisition unit, an object detection unit, an object pose estimation unit, a human area detection unit, a 2D skeleton estimation unit, a scale estimation unit, a relative 3D skeleton estimation unit, an absolute 3D skeleton mapping unit, an action determination unit, and the like. Note that each of the processing units is an example of an electronic circuit provided to the processor or an example of a process executed by the processor.

The image acquisition unit acquires a plurality of captured images, which are a series of frames captured by the camera device 200, from the camera device 200.

The object detection unit uses an existing technology such as YOLO to detect objects from the captured images acquired by the camera device 200. Note that the detected object may be indicated by a bounding box.

The object pose estimation unit inputs a partial image in the bounding box of the cart in the captured image and computer aided design (CAD) data of the cart into a machine learning model, for example, to acquire three-dimensional position and pose data of the cart. Note that the machine learning model is a machine learning model generated by machine learning based on the captured image of the cart and the CAD data of the cart as feature values and the three-dimensional position and pose data of the cart as correct labels, for example.

The human area detection unit identifies the person from the captured image acquired by the camera device 200, and detects the bounding box that is the area of the person.

The 2D skeleton estimation unit uses an existing technology such as Cascaded Pyramid Network (CPN) to generate two-dimensional skeleton information by estimating the pose of the person from a partial image within the bounding box of the person identified from the captured image.

The scale estimation unit uses the two-dimensional skeleton information of the person identified from the captured image to acquire the space between the wrists when the person is grasping the grip part of the cart with both hands, and estimates the scale of the person based on the space and the length information of the grip part of the cart. This is due to the fact that the space between the wrists when the person is grasping the grip part of the cart with both hands roughly matches the length of the grip part of the cart.

When the variance of the distance between the center coordinates of the bounding box of the person and the bounding box of the cart in the captured images consecutively acquired by the camera device 200 is equal to or less than a prescribed threshold, it may be determined that the person is grasping the grip part of the cart. Alternatively, when the moving speeds and directions of the bounding box of the person and the bounding box of the cart in the captured images acquired consecutively are similar within a prescribed range, it may be determined that the person is grasping the grip part of the cart.

Furthermore, the processing of estimating the scale of the person may include processing of calculating an average value of the scales estimated from the captured images acquired consecutively, and estimating the average value as the scale of the person.

The relative 3D skeleton estimation unit uses an existing technology to estimate the three-dimensional skeleton coordinates of each of the body parts with respect to a reference position such as the hips, for example, in the two-dimensional skeleton information of the person. Note that the three-dimensional skeleton coordinates estimated by the relative 3D skeleton estimation unit are relative coordinates normalized relative to the reference position, and the dimensions between the body parts of the person are not in actual size, so that the scale of the person in the present embodiment is estimated. Furthermore, since the three-dimensional skeleton coordinates estimated by the relative 3D skeleton estimation unit are relative to the reference position, absolute coordinates relative to the world coordinates are calculated in the present embodiment.

The absolute 3D skeleton mapping unit uses the estimated scale and the homography transformation matrix, for example, to transform the relative three-dimensional coordinates of the person into absolute three-dimensional skeleton information relative to the world coordinates. Note that the homography transformation matrix may be calculated based on the coordinates of four different predetermined points in the captured image of the store and the world coordinates corresponding to each of those four points, for example. Furthermore, the absolute three-dimensional skeleton information may be calculated for several body parts such as the hips and the right foot, for example, and absolute coordinates of other body parts may be calculated by using the calculated absolute coordinates of the hips and the right foot and the estimated scale.

Based on the absolute three-dimensional skeleton information of the person as well as the three-dimensional position and pose data of the cart, the action determination unit determines and detects the action of the person, such as whether the person has done an action of putting an item into the cart, for example.

Details of Functions

Figure 10:
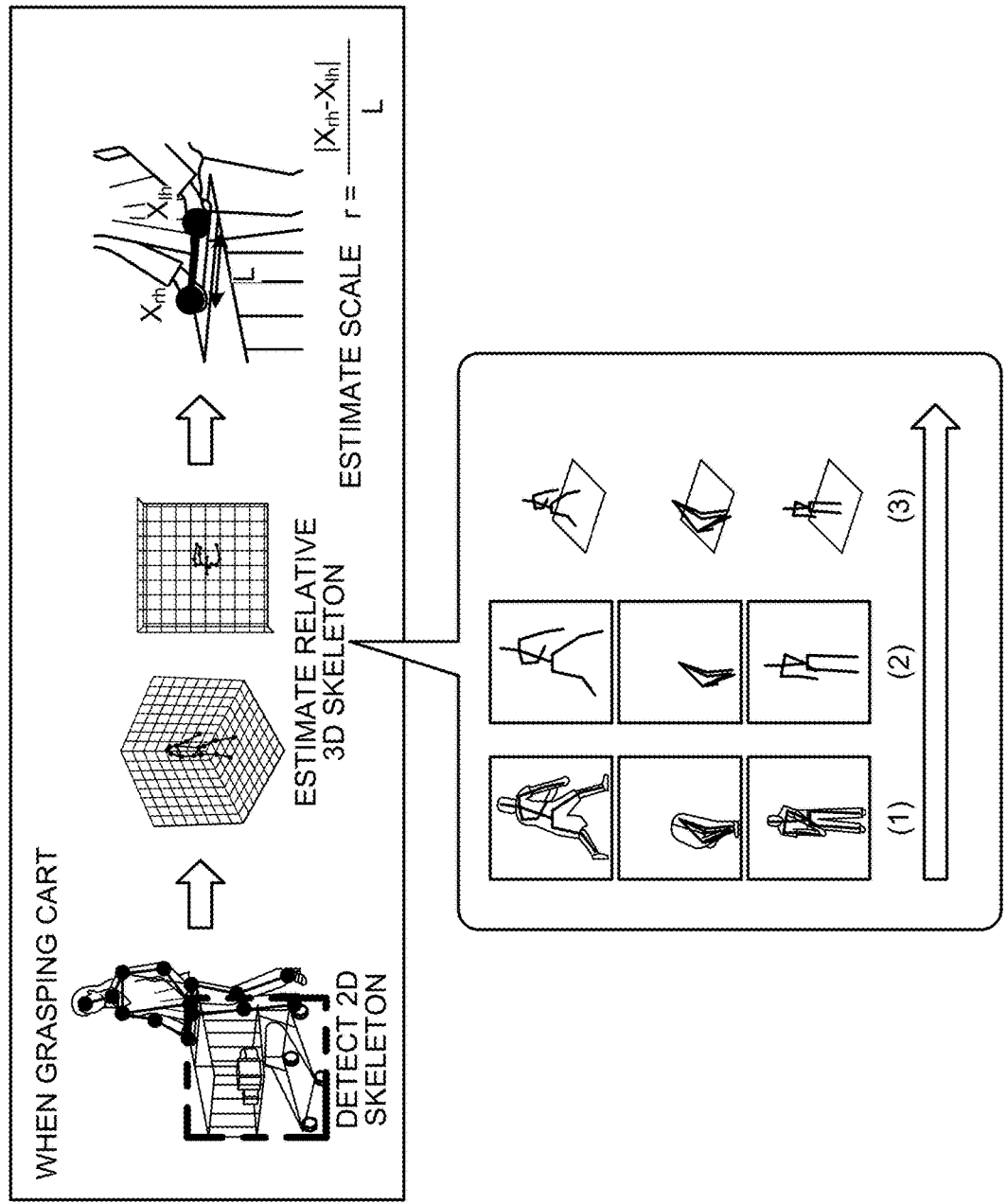
FIG. 10 is a diagram illustrating an example of scale estimation processing according to Example 1.

Next, each piece of the processing executed by having the estimation device 10 as the actor will be described in detail by referring to FIGS. 10 to 17. FIG. 10 is a diagram illustrating an example of scale estimation processing according to Example 1. The scale estimation processing of the person illustrated in FIG. 10 may be executed repeatedly every time a person is detected from the captured image. In doing so, the estimation device 10 assigns an identifier to each person, for example, and stores information about the same person in an associated manner.

The scale estimation processing of the person illustrated in FIG. 10 focuses on the fact that the space between the wrists when the person is grasping the grip part of the cart with both hands roughly matches the length of the grip part, and estimates the scale from the grip part of the cart and the space between the wrists of the person grasping the cart in the captured image. Note that the length information of the grip parts and the like of the carts handled in the store is known in advance, so that it is stored in the estimation device 10.

First, as described by referring to FIG. 5, the estimation device 10 uses the existing technology such as YOLO to detect and identify persons and carts from the captured images acquired by the camera device 200. Then, from among the identified persons, the person grasping the identified cart is further identified. For example, when the variance of the distance between the center coordinates of the bounding box of the person and the bounding box of the cart is equal to or less than a prescribed threshold, the estimation device 10 determines that the person is the person grasping the cart. Then, as described by referring to FIGS. 5 to 7, the estimation device 10 uses an existing technology such as CPN to estimate the pose of the person from a partial image within the bounding box of the person identified as the person grasping the cart, and detects two-dimensional skeleton information.

Then, the estimation device 10 uses the existing technology to estimate the relative three-dimensional skeleton coordinates of each of the body parts with respect to the reference position such as the hips, for example, in the two-dimensional skeleton information of the person. Estimation of the three-dimensional skeleton coordinates is performed as follows, as illustrated in the lower part of FIG. 10: (1) for input images of a person, (2) acquire a true value of each of the body parts with respect to the position of the hips, for example, and (3) estimate relative three-dimensional coordinates of each of the body parts with respect to the hips.

Then, the estimation device 10 calculates a scale r by the following Equation (1), for example, by using the estimated relative three-dimensional coordinates of both wrists and the length of the grip part of the cart.

$$r = \frac{|X_{rh} - X_{lh}|}{L} \quad (1)$$

Here, in Equation (1), "$X_{rh}$" and "$X_{lh}$" represent the estimated relative three-dimensional coordinates of the right and left wrists, respectively, and "L" represents the length of the grip part of the cart. The length of the grip part of the cart may be measured in advance by using a measuring tape or the like. Furthermore, the estimation device 10 may, for example, identify the same person grasping the cart from the captured images, which are a series of frames captured by the camera device 200, estimate the scale for each of the captured images, and use the average value of the estimated scales as the scale r.

As described, the estimation device 10 can recognize the behavior of the person more accurately by estimating the scale of the person grasping the cart and using the estimated scale when recognizing the behavior of the person. Next, the behavior recognition processing of the person will be described. This behavior recognition of the person according to the present embodiment estimates the three-dimensional positions and poses of the person and the cart identified from the captured image, and recognizes the behavior of the person from the estimated three-dimensional information.

Figure 11:
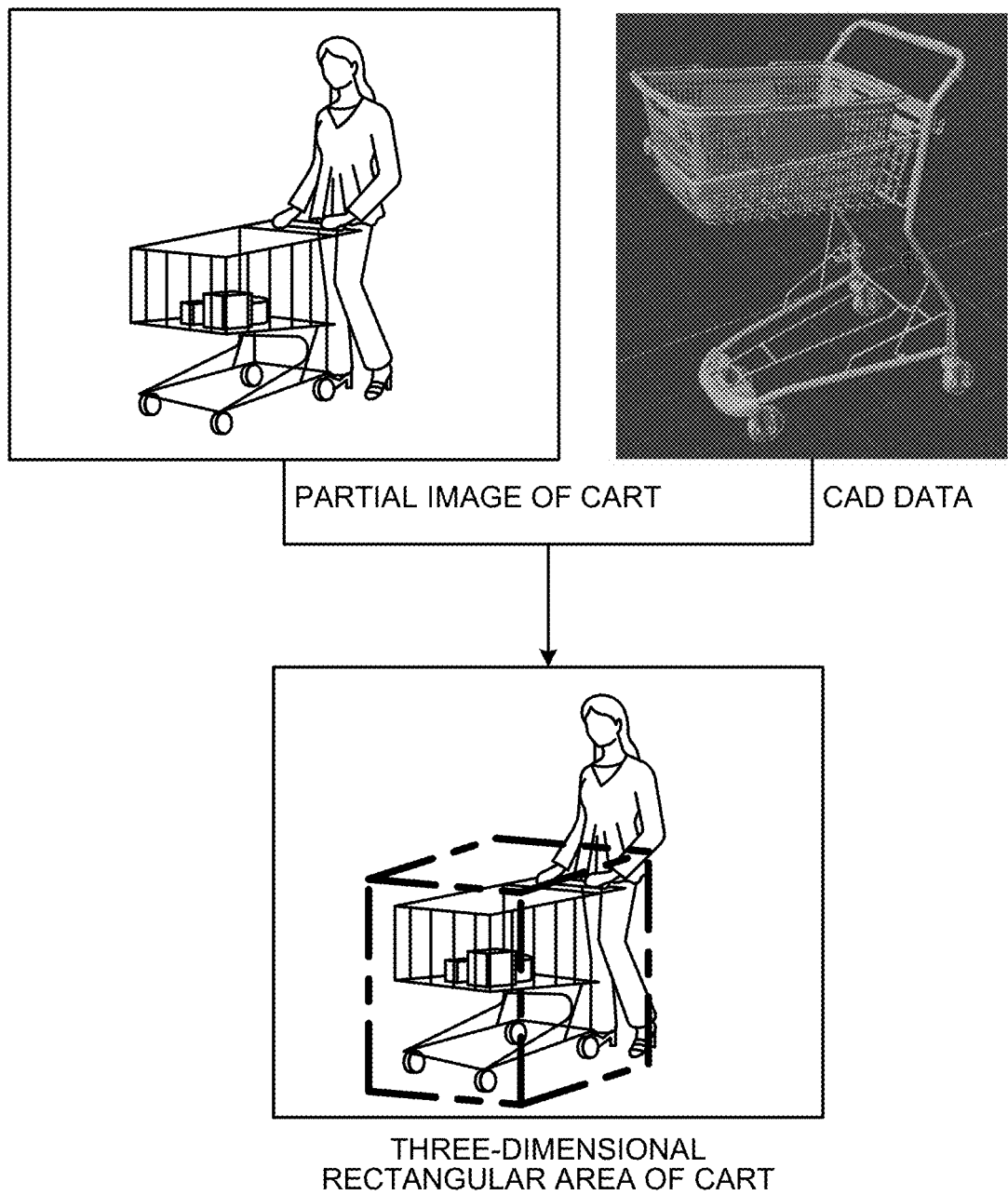
FIG. 11 is a diagram illustrating an example of three-dimensional position and pose acquisition processing according to Example 1.

First, the processing of acquiring three-dimensional position and pose data of the cart identified from the captured image acquired by the camera device 200 will be described. FIG. 11 is a diagram illustrating an example of three-dimensional position and pose acquisition processing according to Example 1. The three-dimensional position and pose acquisition processing illustrated in FIG. 11 may be executed only once at the time of recognizing the behavior of the person.

As illustrated in FIG. 11, the estimation device 10 inputs a partial image in the bounding box of the cart in the captured image and the CAD of the cart to a machine learning model to acquire a three-dimensional rectangular area that is a cuboid area indicating the three-dimensional position and the pose of the cart. The machine learning model used herein is a machine learning model generated by machine learning based on images of a cart captured from multiple directions, having been collected in advance, and the CAD data of the cart as feature values and the three-dimensional rectangular area of the cart in the captured images as the correct labels.

Next, acquisition processing of the three-dimensional position and pose data of the person identified from the captured image acquired by the camera device 200 will be described. First, as described by referring to FIG. 10, the estimation device 10 uses the existing technology to estimate the relative three-dimensional skeleton coordinates of each of the body parts with respect to the reference position such as the hips, for example, in the two-dimensional skeleton information of the person. Furthermore, by multiplying the scale value by the coordinates of each of the body parts on the relative three-dimensional skeleton coordinates, real-scale relative three-dimensional skeleton information with respect to the reference position such as the hips can be acquired. The estimation device 10 then uses the estimated scale and the homography transformation matrix to transform the real-scale relative three-dimensional coordinates of the person into the absolute three-dimensional skeleton information relative to the world coordinates.

Figure 12:
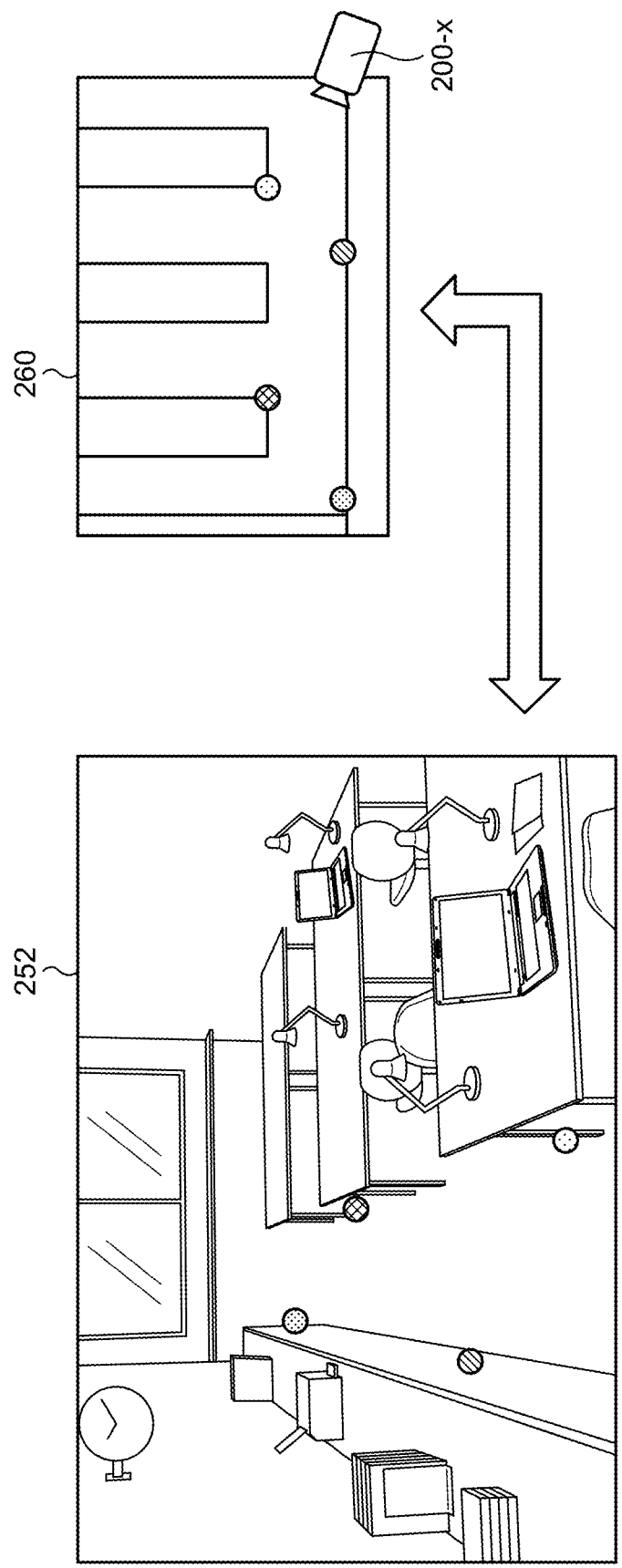
FIG. 12 is a diagram illustrating an example of corresponding relationship between 2D coordinates and 3D coordinates for homography calculation according to Example 1.

Here, a calculation method of the homography transformation matrix used to transform the real-scale relative three-dimensional skeleton coordinates of the person into the absolute three-dimensional skeleton information will be described. FIG. 12 is a diagram illustrating an example of corresponding relationship between 2D coordinates and 3D coordinates for homography calculation according to Example 1. FIG. 12 illustrates a corresponding relationship between the two-dimensional coordinates of four points on a captured image 252 and the three-dimensional coordinates as the world coordinates of four points on a layout diagram 260, which correspond to the respective four points on the captured image 252. The layout diagram 260 is a layout diagram or the like of the imaging locations at the time of construction, which is the layout when the imaging locations caught in the captured image 252 are viewed from the above. The same markers on the captured image 252 and on the layout diagram 260 indicate the same locations, respectively.

For example, the estimation device 10 uses the two-dimensional coordinates of the four points on the captured image 252 and the three-dimensional coordinates of the corresponding four points on the layout diagram 260 to calculate the homography transformation matrix using an existing technology such as the direct linear transformation (DLT) method, or the like. The homography transformation matrix is expressed by the following Equation (2).

$$\begin{pmatrix} x \\ y \\ 1 \end{pmatrix} = \begin{pmatrix} h_{11} & h_{12} & h_{13} \\ h_{21} & h_{22} & h_{23} \\ h_{31} & h_{32} & 1 \end{pmatrix} \begin{pmatrix} u \\ v \\ 1 \end{pmatrix} \quad (2)$$

Here, in Equation (2), "u" and "v" represent the two-dimensional coordinates to be input, and "x", "y", and "1" (z-value) represent the transformed three-dimensional coordinates. The three-dimensional coordinates calculated by Equation (2) are the three-dimensional coordinates on the ground with the z-value set as "0". Therefore, in the present embodiment, it is assumed that the x and y coordinates of the foot position and the hips are the same coordinates when the person is standing, and the z coordinate is replaced by the leg length $h_{leg}$.

Figure 13:
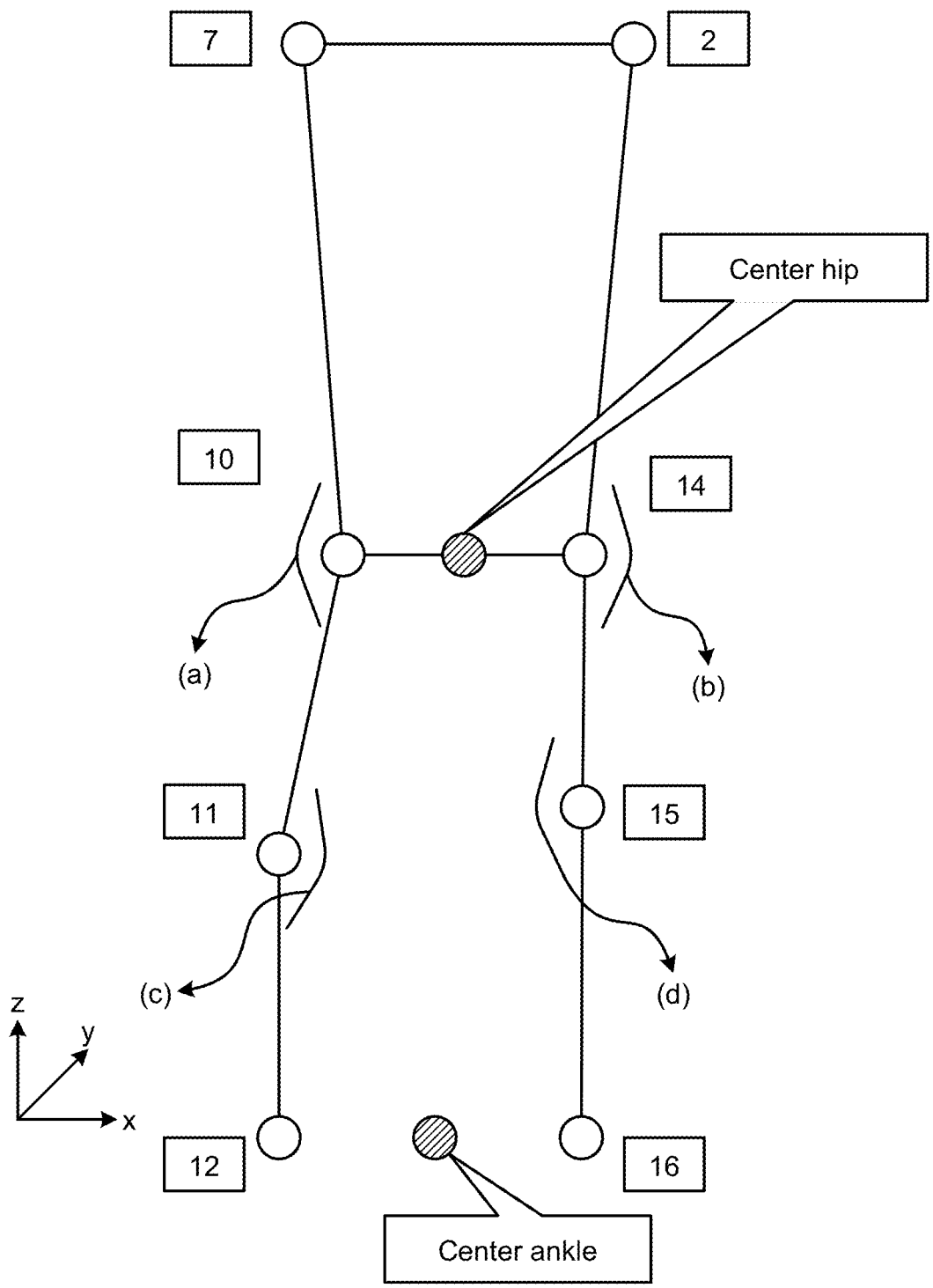
FIG. 13 is a diagram illustrating an example of setting reference positions according to Example 1.

The calculation method of the leg length $h_{leg}$ will be described hereinafter. FIG. 13 is a diagram illustrating an example of setting reference positions according to Example 1. FIG. 13 illustrates the skeleton information of the whole body illustrated in FIG. 7, in which the center between the hips (Center hip) and the center between the feet (Center ankle) are set as reference positions. The leg length $h_{leg}$ is calculated from the distance between the Center hip and the Center ankle in the height direction, that is, the distance between their coordinates in the z-axis direction.

Figure 14:
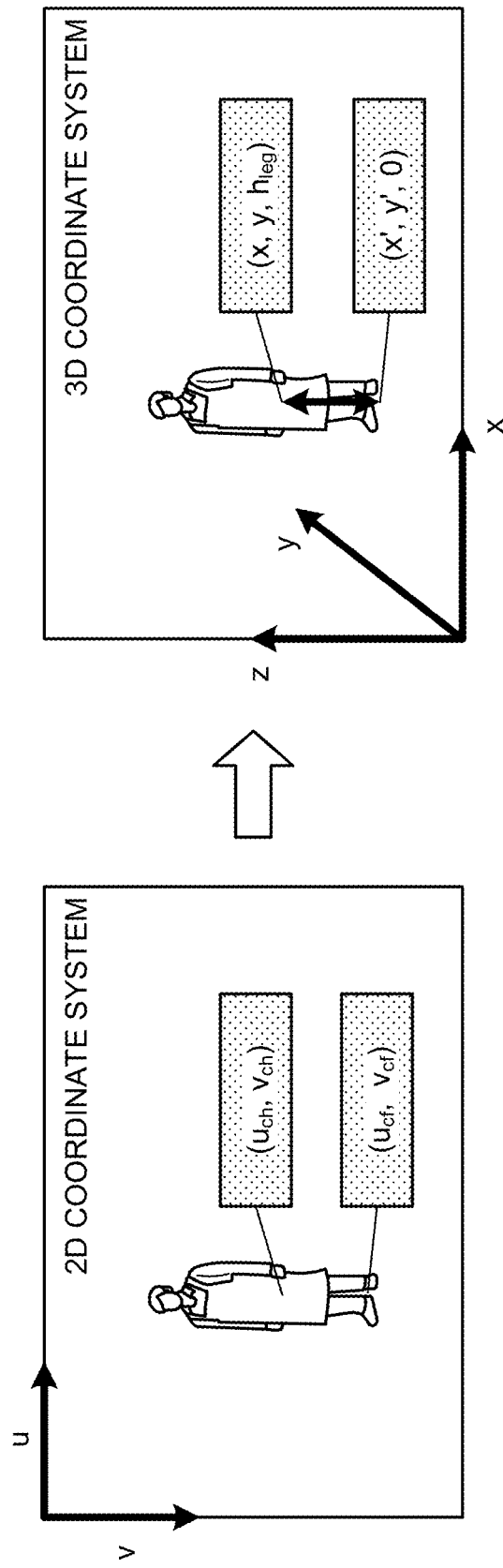
FIG. 14 is a diagram illustrating an example of positional relationship between 2D and 3D coordinate systems according to Example 1.

FIG. 14 is a diagram illustrating an example of positional relationship between 2D and 3D coordinate systems according to Example 1. As illustrated on the right side of FIG. 14, assuming that the three-dimensional coordinates of the Center ankle are (x', y', 0), the three-dimensional coordinates of the Center hip can be expressed as (x, y, $h_{leg}$). Note that "$h_{leg}$" is acquired as a value calculated by multiplying the 3-dimensional distance between the Center hip and the Center ankle by the scale. Furthermore, the three-dimensional coordinates (x, y, $h_{leg}$) of the Center hip can be calculated by using the two-dimensional coordinates ($u_{ch}$, $v_{ch}$) of the Center hip and the homography transformation matrix expressed by the following Equation (3).

$$\begin{pmatrix} x \\ y \\ 1 \end{pmatrix} = \begin{pmatrix} h_{11} & h_{12} & h_{13} \\ h_{21} & h_{22} & h_{23} \\ h_{31} & h_{32} & 1 \end{pmatrix} \begin{pmatrix} u_{ch} \\ v_{ch} \\ 1 \end{pmatrix} \quad (3)$$

Equation (3) is an equation in which the two-dimensional coordinates and the three-dimensional coordinates in Equation (2) are replaced by the coordinates of the Center hip. Furthermore, "the third row of the three-dimensional coordinates (x, y, 1) of the Center hip in Equation (3), that is, the z-coordinate part, is set to 1" means that the x and y values are divided such that the part is set to 1. The z-coordinate part is replaced by the leg length $h_{leg}$, as expressed in the following Equation (4).

$$\begin{pmatrix} x \\ y \\ 1 \end{pmatrix} \rightarrow \begin{pmatrix} x \\ y \\ h_{leg} \end{pmatrix} \quad (4)$$

Furthermore, the three-dimensional coordinates (x', y', 0) of the Center ankle can be calculated using the two-dimensional coordinates ($u_{cf}$, $v_{cf}$) of the Center ankle and the homography transformation matrix expressed by the following Equation (5).

$$\begin{pmatrix} x' \\ y' \\ 1 \end{pmatrix} = \begin{pmatrix} h_{11} & h_{12} & h_{13} \\ h_{21} & h_{22} & h_{23} \\ h_{31} & h_{32} & 1 \end{pmatrix} \begin{pmatrix} u_{ch} \\ v_{ch} \\ 1 \end{pmatrix} \quad (5)$$

Equation (5) is an equation in which the two-dimensional coordinates and the three-dimensional coordinates in Equation (2) are replaced by the coordinates of the Center ankle. Furthermore, as for the three-dimensional coordinates (x', y', 1) of the Center ankle, the z-coordinate part is replaced by the coordinate value "0" of the ground, as expressed in the following Equation (6).

$$\begin{pmatrix} x' \\ y' \\ 1 \end{pmatrix} \rightarrow \begin{pmatrix} x' \\ y' \\ 0 \end{pmatrix} \quad (6)$$

By using the above Equations (3) to (6), the estimation device 10 can calculate the absolute three-dimensional coordinates of the Center hip and the Center ankle. Furthermore, absolute three-dimensional coordinates of the other body parts can be calculated by using the relative three-dimensional coordinates and absolute three-dimensional coordinates of the Center hip and the Center ankle.

Figure 15:
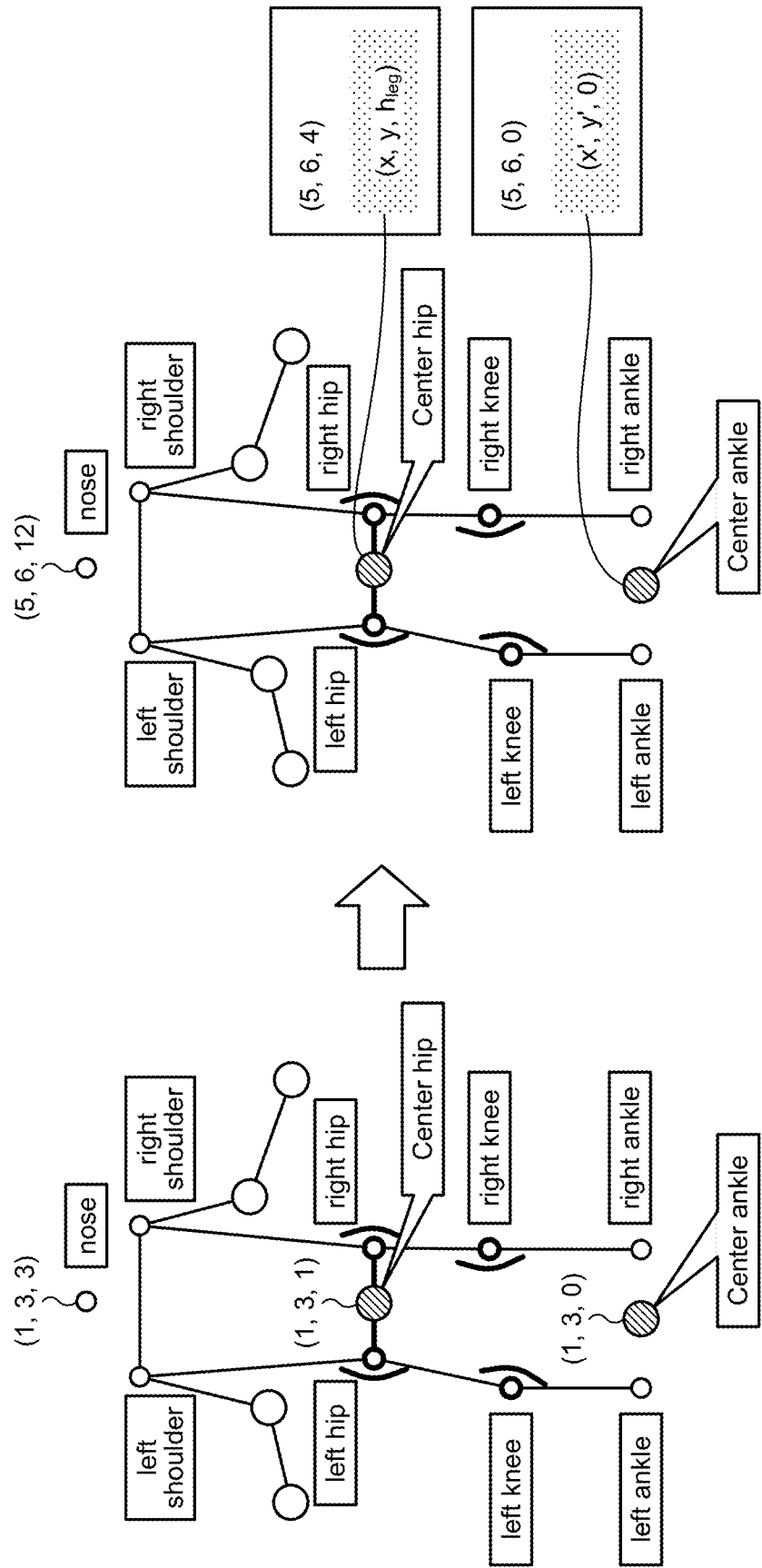
FIG. 15 is a diagram illustrating an example of absolute 3D skeleton position estimation by world coordinate mapping of a 3D skeleton according to Example 1.

FIG. 15 is a diagram illustrating an example of absolute 3D skeleton position estimation by world coordinate mapping of 3D skeleton according to Example 1. As illustrated on the left side of FIG. 15, for example, it is assumed that the relative three-dimensional coordinates of the Center ankle, the Center hip, and the head are (1,3,0), (1,3,1), and (1,3,3), respectively. Furthermore, as illustrated on the right side of FIG. 15, for example, it is assumed that the absolute three-dimensional coordinates of the Center ankle and the Center hip are calculated from the relative three-dimensional coordinates by using the estimated scale and the homography transformation matrix to be (5,6,0) and (5,6,4), respectively.

Furthermore, based on the relative three-dimensional coordinates of the Center ankle and the Center hip, the vector from the Center hip to the Center ankle is "(1,3,0)–(1,3,1)=(0,0,–1)". Similarly, the vector from the Center hip to the head is "(1,3,3)–(1,3,1)=(0,0,2)". Furthermore, since the scale in the example of FIG. 15 is four times, the absolute three-dimensional coordinates of the head are "(5,6,4)+(0,0,2)×4=(5,6,12)". Strictly speaking, the direction of rotation also needs to be considered depending on the body parts, but as described by referring to FIG. 15, it is possible to calculate the absolute three-dimensional coordinates of the other body parts from the absolute three-dimensional coordinates of the two reference body parts.

As described above, the estimation device 10 calculates the three-dimensional information of the person and the cart identified from the captured image. Furthermore, the estimation device 10 detects the behavior of the person and recognizes the action thereof by using the calculated three-dimensional information of the person and the cart.

Figure 16:
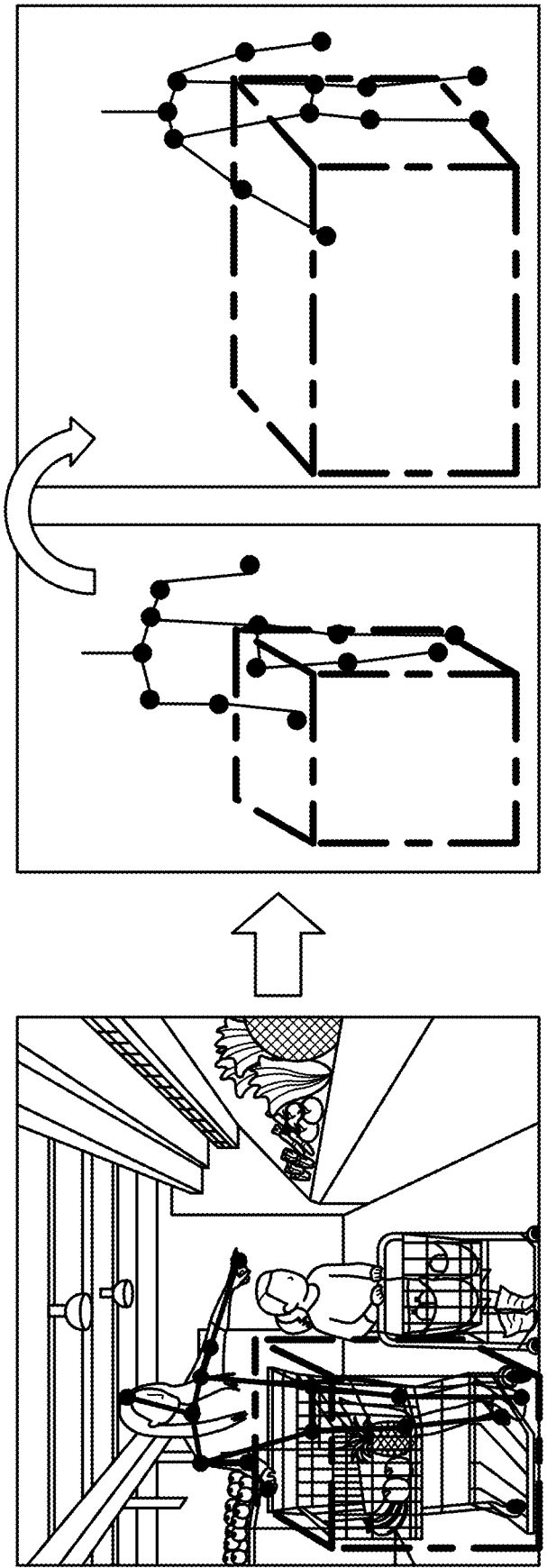
FIG. 16 is a diagram illustrating an example of action detection processing according to Example 1.

FIG. 16 is a diagram illustrating an example of action detection processing according to Example 1. On the left side of FIG. 16, the skeleton information of the person is the calculated absolute three-dimensional coordinates as described by referring to FIG. 15 and the like, and a cuboid area surrounding the cart is the three-dimensional rectangular area indicating the three-dimensional position and pose of the cart as described by referring to FIG. 11.

Furthermore, as illustrated on the right side of FIG. 16, when the absolute three-dimensional coordinate position of the right wrist or left wrist of the person enters inside the three-dimensional coordinate position of the cuboid area of the cart, for example, the estimation device 10 determines that the person puts his or her hand into the cart. Thereby, the estimation device 10 can detect the action of putting an item into the cart or the like by the person, for example. By using absolute three-dimensional information, the estimation device 10 can also detect the actions of the person and perform behavior recognition without being affected by the angle of the captured image. Then, the estimation device 10 can store the behaviors such as purchasing items by the behavior recognition of the person, and determine whether there is any fraudulent behavior to detect a fraudulent behavior.

Figure 17:
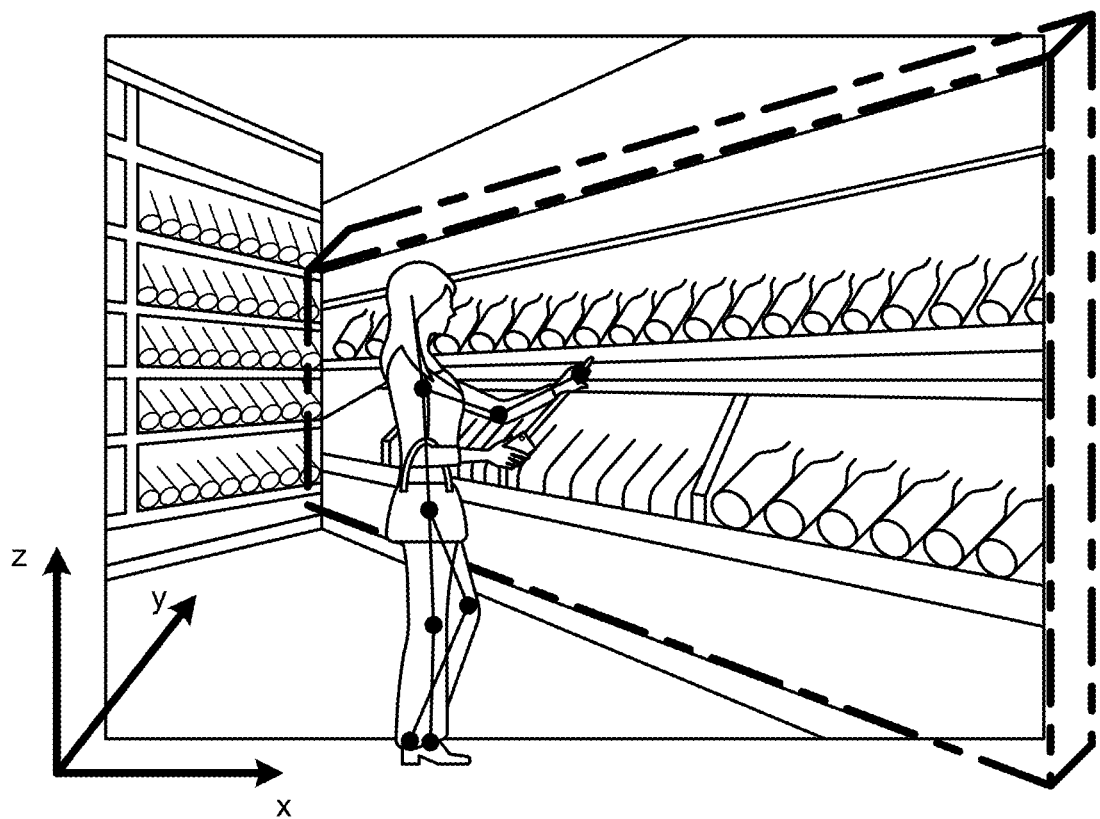
FIG. 17 is a diagram illustrating another example of the action detection processing according to Example 1.

In addition, by measuring in advance the three-dimensional coordinate positions of not only the carts but also shelves and the like in the store and storing those in the estimation device 10, it is possible to increase the types of persons' behaviors that can be recognized. FIG. 17 is a diagram illustrating another example of the action detection processing according to Example 1. For example, the three-dimensional coordinate positions of cuboid areas of the shelves are stored in advance in the estimation device 10.

Furthermore, as illustrated in FIG. 17, when the absolute three-dimensional coordinate position of the right wrist or left wrist of the person enters inside the three-dimensional coordinate position of the cuboid area of the shelf, for example, the estimation device 10 determines that the person puts his or her hand into the shelf. Thereby, the estimation device 10 can detect the action of the person picking an item from the shelf, for example.

Flow of Processing

Figure 18:
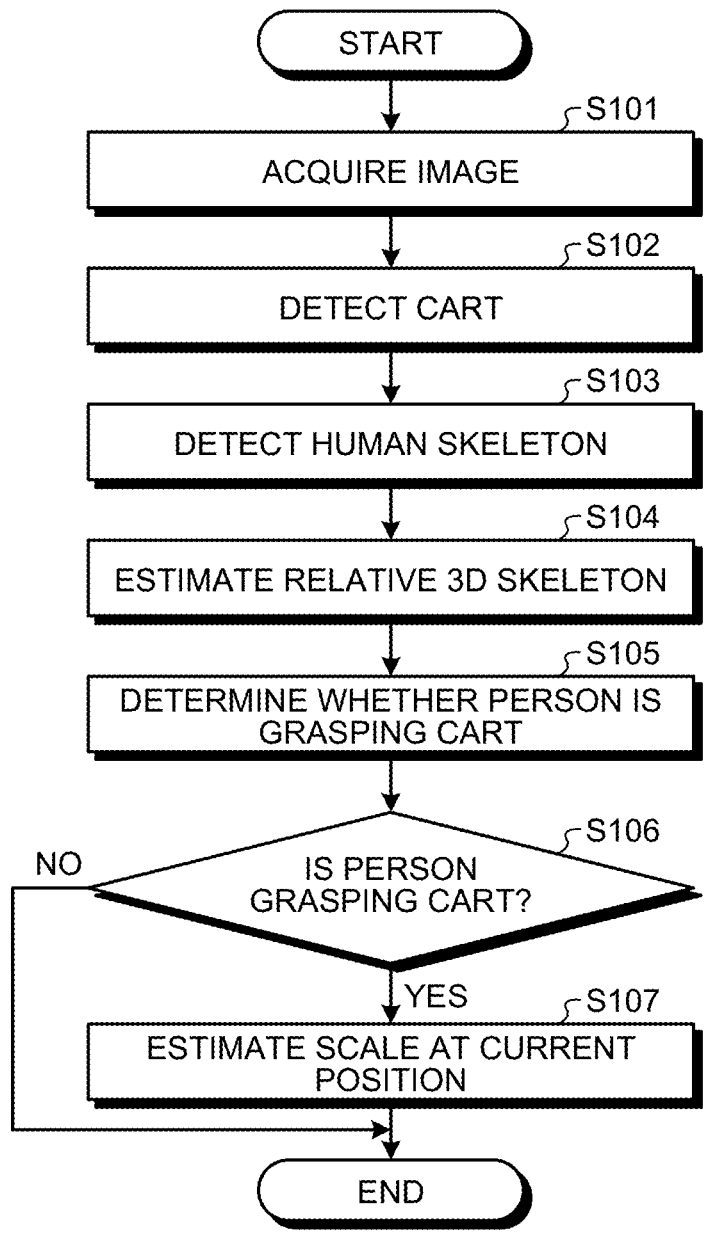
FIG. 18 is a flowchart illustrating a flow of the scale estimation processing according to Example 1.

Next, the flow of the scale estimation processing of the person executed by the estimation device 10 will be described. FIG. 18 is a flowchart illustrating the flow of the scale estimation processing according to Example 1. The scale estimation processing illustrated in FIG. 18 may be executed, for example, at regular intervals or every time a captured image is received from the camera device 200.

First, as illustrated in FIG. 18, the estimation device 10 acquires, from the storage unit 30, the captured image of a prescribed imaging range such as inside the retail store or on the premises captured by the camera device 200 (step S101). In the present embodiment, the captured image acquired by the camera device 200, strictly speaking, the surveillance video is processed in real time, so that the captured image is transmitted sequentially from the camera device 200 and stored in the storage unit 30.

Then, the estimation device 10 uses an existing object detection algorithm to detect a cart from the captured image acquired at step S101 (step S102).

Then, the estimation device 10 uses the existing object detection algorithm to detect a person from the captured image acquired at step S101 and, further uses existing pose estimation and skeleton estimation algorithms to detect the two-dimensional skeleton information of the detected person (step S103). Note that the execution order of step S102 and step S103 may be reversed or may be executed in parallel. Furthermore, when a plurality of persons are detected from the captured image, the processing of step S103 and thereafter is executed for each of the detected persons.

Then, the estimation device 10 uses the existing technology to estimate the relative three-dimensional skeleton coordinates of each of the body parts with respect to the reference position such as the hips, for example, in the two-dimensional skeleton information detected at step S103 (step S104).

The estimation device 10 then determines whether the detected person is grasping the cart based on the bounding box of the person and the bounding box of the cart detected from the captured image (step S105). When the detected person is not grasping the cart (No at step S106), the scale estimation processing illustrated in FIG. 18 ends.

On the other hand, when the detected person is grasping the cart (Yes at step S106), the estimation device 10 estimates the scale of the person (step S107). The scale estimation of the person at step S107 is performed based on the space between the wrists of the person that has been acquired from the relative three-dimensional skeleton coordinates estimated at step S104, and based on the length information of the grasping part of the cart. After execution of step S107, the scale estimation processing illustrated in FIG. 18 ends.

Figure 19:
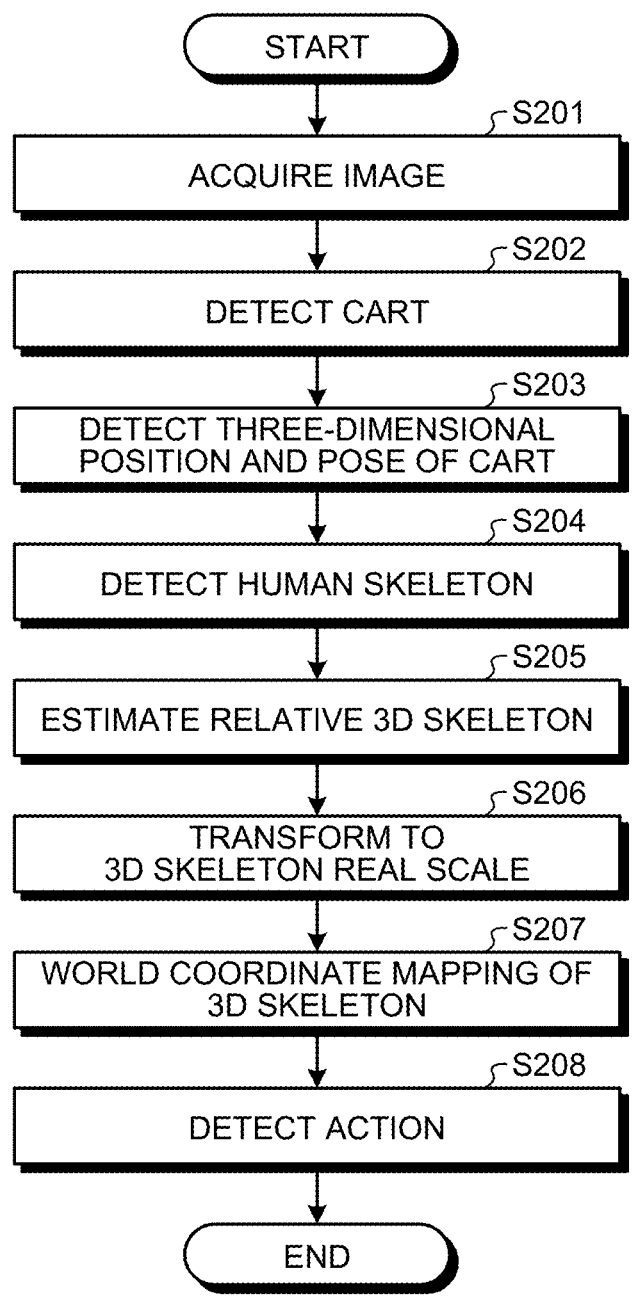
FIG. 19 is a flowchart illustrating a flow of the action detection processing according to Example 1.

Next, the flow of the action detection processing of the person executed by the estimation device 10 will be described. FIG. 19 is a flowchart illustrating the flow of the action detection processing according to Example 1. The action detection processing illustrated in FIG. 19 may be executed only once at the time of recognizing the behavior of the person, for example.

First, as illustrated in FIG. 19, the estimation device 10 acquires, from the storage unit 30, the captured image of a prescribed imaging range such as inside the retail store or on the premises captured by the camera device 200 (step S201).

Then, the estimation device 10 uses an existing object detection algorithm to detect a cart from the captured image acquired at step S201 (step S202).

The estimation device 10 then inputs a partial image in the bounding box of the cart detected at step S202 and the CAD of the cart to a machine learning model to detect a three-dimensional rectangular area that is a cuboid area indicating the three-dimensional position and the pose of the cart (step S203).

Then, the estimation device 10 uses the existing object detection algorithm to detect a person from the captured image acquired at step S201 and, further uses existing pose estimation and skeleton estimation algorithms to detect the two-dimensional skeleton information of the detected person (step S204). The execution order of steps S202, S203 and step S204 may be reversed or may be executed in parallel.

Then, the estimation device 10 uses the existing technology to estimate the three-dimensional skeleton coordinates of each of the body parts with respect to the reference position such as the hips, for example, in the two-dimensional skeleton information of the person (step S205).

The estimation device 10 then multiplies and transforms the coordinates of each of the body parts on the three-dimensional skeleton coordinates estimated at step S205 by the scale estimated at step S107 to acquire the relative three-dimensional skeleton information in real scale with respect to the reference position such as the hips (step S206).

Thereafter, the estimation device 10 maps the relative three-dimensional skeleton coordinates acquired at step S206 onto the world coordinates to transform it to the absolute three-dimensional skeleton information by using the scale estimated at step S107 and the homography transformation matrix (step S207).

Then, the estimation device 10 detects the action of the person, for example, an action of putting an item into the cart by the person, based on the absolute three-dimensional skeleton information acquired at step S207 and the three-dimensional position and pose of the cart detected at step S203 (step S208). While the action detection processing illustrated in FIG. 19 ends after executing step S208, if a fraudulent behavior of the person is recognized by the action detection executed at step S208, the estimation device 10 notifies the clerk terminal 300 or the like of an alert.

Effect

As described above, the estimation device 10 identifies a first person using a first cart from a first image acquired by capturing inside the store, generates skeleton information of the first person, acquires, by using the skeleton information, a first space in which the first person is grasping the grip part of the first cart, and estimates a first scale of the first person based on the first space and the length information of the first cart.

In this manner, the estimation device 10 generates the skeleton information of the person using the cart identified from the captured image, and estimates the scale of the person from the cart grasping space acquired from the skeleton information and the length information of the cart.

Thereby, the estimation device 10 can more accurately estimate the scale of the person from the captured image.

Furthermore, when the variance of the distance between the center coordinates of the bounding box of the first person and the bounding box of the first cart in a plurality of the first images captured consecutively is equal to or less than a prescribed threshold, the estimation device 10 determines that the first person is grasping the grip part.

Thereby, the estimation device 10 can more accurately determine from the captured images that the person is grasping the cart.

Furthermore, the processing of estimating the first scale executed by the estimation device 10 includes processing of calculating the average value of the first scales estimated from the first images and estimating the average value as the first scale.

Thereby, the estimation device 10 can more accurately estimate the scale by reducing the errors in the scales between the captured images.

Furthermore, the processing of generating the skeleton information executed by the estimation device 10 includes the processing of generating the two-dimensional skeleton information of the first person, and the estimation device 10 uses the homography transformation matrix and the first scale to transform the two-dimensional skeleton information to the three-dimensional skeleton information.

Thereby, the estimation device 10 can more accurately estimate the three-dimensional skeleton information of the person from the captured images.

Furthermore, the estimation device 10 calculates the homography transformation matrix based on the coordinates of prescribed four different points in a second image acquired by capturing inside the store and the world coordinates corresponding to each of the four points.

Thereby, the estimation device 10 can more accurately estimate the three-dimensional skeleton information of the person from the captured images.

Furthermore, the processing of transforming the two-dimensional skeleton information to the three-dimensional skeleton information executed by the estimation device 10 includes processing of transforming the coordinates of prescribed two body parts in the two-dimensional skeleton information into the coordinates of the corresponding two body parts in the three-dimensional skeleton information by using the homography transformation matrix and the first scale, and calculating the coordinates of the other body parts in the three-dimensional skeleton information by using the two-dimensional skeleton information, the coordinates of the corresponding two body parts in the three-dimensional skeleton information, and the first scale.

Thereby, the estimation device 10 can more accurately estimate the three-dimensional skeleton information of the person from the captured images.

The estimation device 10 also recognizes a prescribed behavior of the first person based on the three-dimensional skeleton information.

Thereby, the estimation device 10 can more accurately recognize the behavior of the person from the captured image.

Furthermore, the estimation device 10 acquires the three-dimensional position and pose data of the first cart by inputting, into a machine learning model generated by machine learning based on the captured image of the cart and the CAD data of the cart as feature values and the three-dimensional position and pose data of the cart as correct labels, a partial image in the bounding box of the first cart in the first image and the CAD data of the first cart.

Thereby, the estimation device 10 can more accurately estimate the three-dimensional information of the cart from the captured images.

Furthermore, the processing of recognizing a prescribed behavior executed by the estimation device 10 includes the processing of detecting an action of putting an item into the cart by the first person, based on the three-dimensional skeleton information and the three-dimensional position and pose data of the first cart.

Thereby, the estimation device 10 can more accurately recognize the behavior of the person from the captured images.

System

The information including the processing procedures, control procedures, specific names, and various kinds of data and parameters indicated in the above description and drawings may be changed as desired, unless otherwise specified. Furthermore, the specific examples, distributions, numerical values, and the like described in Example are simply presented as examples and may be changed as desired.

Also, the specific forms of distribution and integration of the structural components of each device are not limited to those illustrated in the drawings. That is, all or some of the structural components may be functionally or physically distributed or integrated in arbitrary units, depending on various loads, usage conditions, and the like. Furthermore, all or some of the processing functions of each device may be achieved by a central processing unit (CPU) and a computer program that is analyzed and executed by the CPU, or may be achieved as hardware using wired logic.

Hardware

Figure 20:
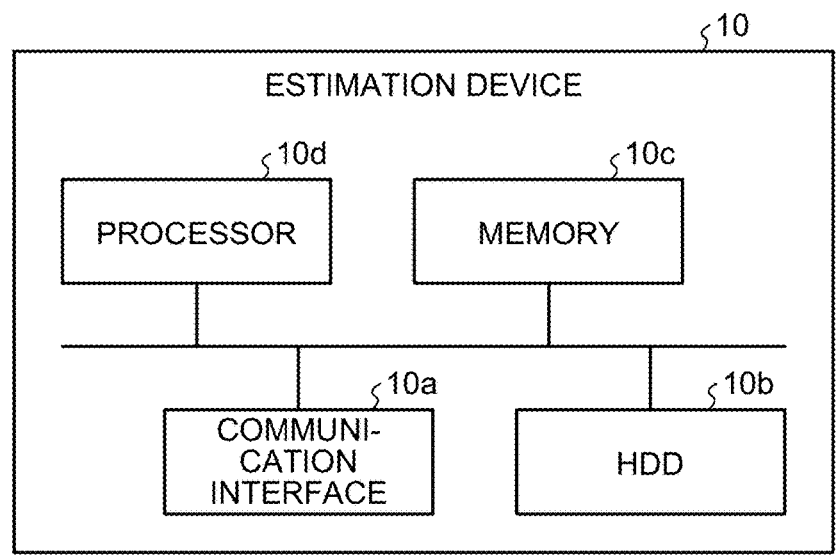
FIG. 20 is a diagram for describing a hardware configuration example of the estimation device 10.

FIG. 20 is a diagram for describing a hardware configuration example of the estimation device 10. As illustrated in FIG. 20, the estimation device 10 includes a communication interface 10a, a hard disk drive (HDD) 10b, a memory 10c, and a processor 10d. Furthermore, the units illustrated in FIG. 20 are connected mutually via a bus or the like.

The communication interface 10a is a network interface card or the like, and communicates with other information processing devices. The HDD 10b stores therein computer programs and data for operating the functions illustrated in FIG. 9.

The processor 10d is a hardware circuit that operates the process for executing each of the functions described in FIG. 9 and the like by reading the computer program for executing the same processing as that of each of the processing units illustrated in FIG. 9 from the HDD 10b or the like and loading it on the memory 10c. That is, this process executes the same functions as those of the processing units of the estimation device 10. Specifically, the processor 10d reads the computer program having the same functions as those of the image acquisition unit, the object detection unit, and the like from the HDD 10b or the like. The processor 10d then executes the process that executes the same processing as that of the image acquisition unit, the object detection unit, and the like.

As described, the estimation device 10 operates as an information processing device that executes operation control processing by reading and executing the computer program for executing the same processing as that of each of the processing units illustrated in FIG. 9. Furthermore, the estimation device 10 can also achieve the same functions as those of Example described above by reading the computer program from a recording medium by a medium reading device and executing the read computer program. Note that the computer program referred in another example mentioned herein not limited to being executed by the estimation device 10. For example, the present embodiment may also be applied in the same manner to such cases where the computer program is executed by another computer or server and where the computer program is executed by those in cooperation.

In addition, the computer program that executes the same processing as that of each of the processing units illustrated in FIG. 9 can also be distributed via a network such as the Internet. Furthermore, the computer program can be executed by being recorded on a computer-readable recording medium such as a hard disk, a flexible disk (FD), a CD-ROM, a magneto-optical disk (MO), a digital versatile disc (DVD), or the like and by being read from the recording medium by a computer.

Figure 21:
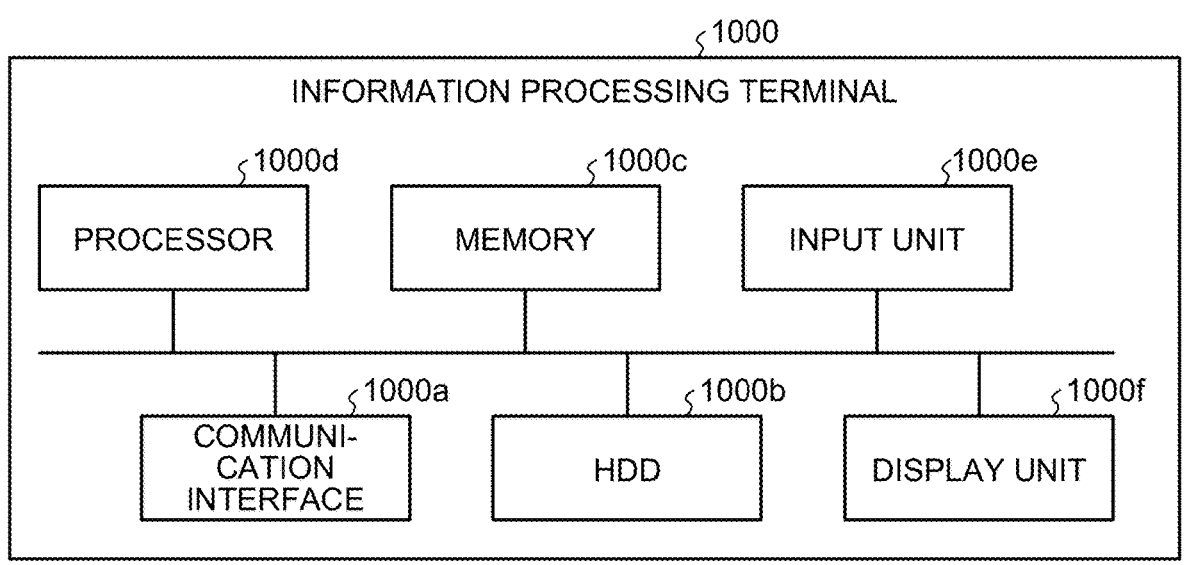
FIG. 21 is a diagram for describing a hardware configuration example of an information processing terminal 1000.

FIG. 21 is a diagram for describing a hardware configuration example of an information processing terminal 1000. Since the user terminal 100 and the clerk terminal 300 may have similar configurations, the user terminal 100 and the clerk terminal 300 are collectively illustrated as the information processing terminal 1000 in FIG. 21 as a hardware configuration example of the user terminal 100 and the clerk terminal 300. As illustrated in FIG. 21, the information processing terminal 1000 includes a communication interface 1000a, an HDD 1000b, a memory 1000c, a processor 1000d, an input unit 1000e, and a display unit 1000f. Furthermore, the units illustrated in FIG. 21 are connected mutually via a bus or the like.

The communication interface 1000a is a network interface card or the like, and communicates with other information processing devices. The HDD 1000b stores therein computer programs and data for operating each function of the information processing terminal 1000.

The processor 1000d is a hardware circuit that operates the process for executing each of the functions of the information processing terminal 1000 by reading the computer program for executing each of the functions of the information processing terminal 1000 from the HDD 1000b or the like and loading it on the memory 1000c. That is, this process executes the same functions as those of the processing units of the information processing terminal 1000.

As described, the information processing terminal 1000 operates as an information processing device that executes operation control processing by reading and executing the computer program that executes the processing of each of the functions of the information processing terminal 1000. Furthermore, the information processing terminal 1000 can also achieve each of the functions of the information processing terminal 1000 by reading the computer program from a recording medium by a medium reading device and executing the read computer program. Note that the computer program referred in another example mentioned herein is not limited to being executed by the information processing terminal 1000. For example, the present embodiment may also be applied in the same manner to such cases where the computer program is executed by another computer or server and where the computer program is executed by those in cooperation.

In addition, the computer program that executes the processing of each of the functions of the information processing terminal 1000 can also be distributed via a network such as the Internet. Furthermore, the computer program can be executed by being recorded on a computer-readable recording medium such as a hard disk, a FD, a CD-ROM, a MO, a DVD, or the like and by being read from the recording medium by a computer.

The input unit 1000e detects various kinds of input operations of the user, such as input operations for the computer program that is executed by the processor 1000*d*. Such input operations include, for example, a touch operation, insertion of an earphone jack into the information processing terminal 1000, and the like. Note here that touch operations refer to various kinds of contact actions for the display unit 1000*f*, such as tapping, double-tapping, swiping, pinching, and the like. The touch operations also include actions of moving objects such as fingers and the like close to the display unit 1000*f*, for example. The input unit 1000*e* may also be a button, a touch panel, a proximity sensor, or the like, for example.

The display unit 1000*f* displays various kinds of visual information under the control of the processor 1000*d*. The display unit 1000*f* may be a liquid crystal display (LCD), an organic light-emitting diode (OLED), what is called an organic electroluminescence (EL) display, or the like.

Figure 22:
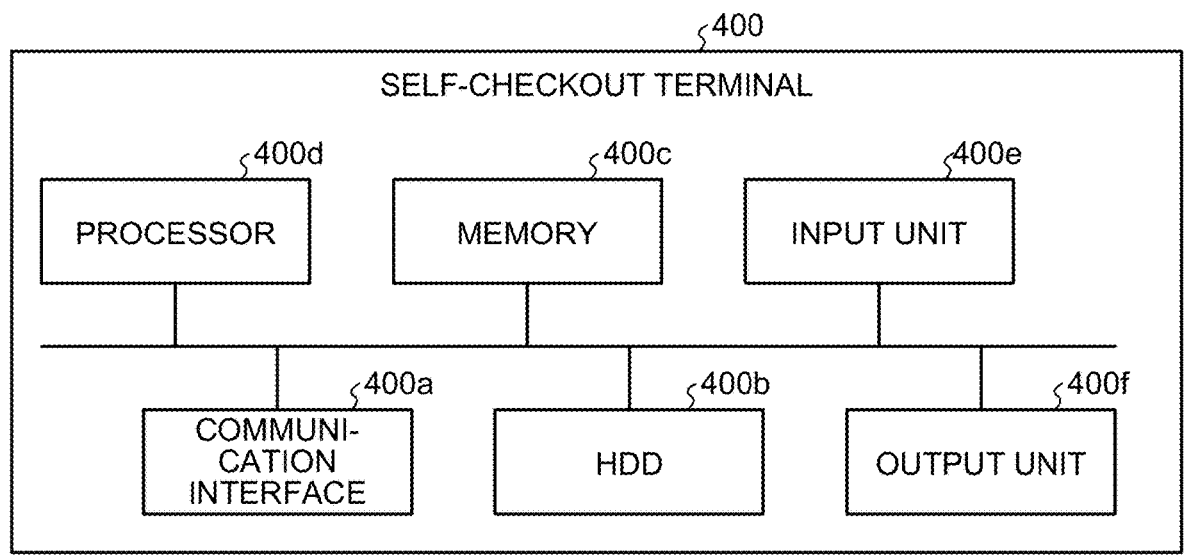
FIG. 22 is a diagram for describing a hardware configuration example of a self-checkout terminal 400.

FIG. 22 is a diagram for describing a hardware configuration example of the self-checkout terminal 400. As illustrated in FIG. 22, the self-checkout terminal 400 includes a communication interface 400*a*, an HDD 400*b*, a memory 400*c*, a processor 400*d*, an input unit 400*e*, and an output unit 400*f*. Furthermore, the units illustrated in FIG. 22 are connected mutually via a bus or the like.

The communication interface 400*a* is a network interface card or the like, and communicates with other information processing devices. The HDD 400*b* stores therein computer programs and data for operating each function of the self-checkout terminal 400.

The processor 400*d* is a hardware circuit that operates the process for executing each of the functions of the self-checkout terminal 400 by reading the computer program for executing each of the functions of the self-checkout terminal 400 from the HDD 400*b* or the like and loading it on the memory 400*c*. That is, this process executes the same functions as those of the processing units of the self-checkout terminal 400.

As described, the self-checkout terminal 400 operates as an information processing device that executes operation control processing by reading and executing the computer program that executes the processing of each of the functions of the self-checkout terminal 400. Furthermore, the self-checkout terminal 400 can also achieve each of the functions of the self-checkout terminal 400 by reading the computer program from a recording medium by a medium reading device and executing the read computer program. Note that the computer program referred in another example mentioned herein is not limited to being executed by the self-checkout terminal 400. For example, the present embodiment may also be applied in the same manner to such cases where the computer program is executed by another computer or server and where the computer program is executed by those in cooperation.

In addition, the computer program that executes the processing of each of the functions of the self-checkout terminal 400 can also be distributed via a network such as the Internet. Furthermore, the computer program can be executed by being recorded on a computer-readable recording medium such as a hard disk, a FD, a CD-ROM, a MO, a DVD, or the like and by being read from the recording medium by a computer.

The input unit 400*e* detects various kinds of input operations of the user, such as input operations for the computer program that is executed by the processor 400*d*. Such input operations include a touch operation and the like, for example. In a case of touch operation, the self-checkout terminal 400 may further include a display unit, and the input operation detected by the input unit 400*e* may be a touch operation for the display unit. The input unit 400*e* may also be a button, a touch panel, a proximity sensor, or the like, for example.

The output unit 400*f* outputs data output from the computer program executed by the processor 400*d* via an external device connected to the self-checkout terminal 400, such as an external display device or the like. When the self-checkout terminal 400 includes a display unit, the self-checkout terminal 400 does not need to have the output unit 400*f*.

Figure 23:
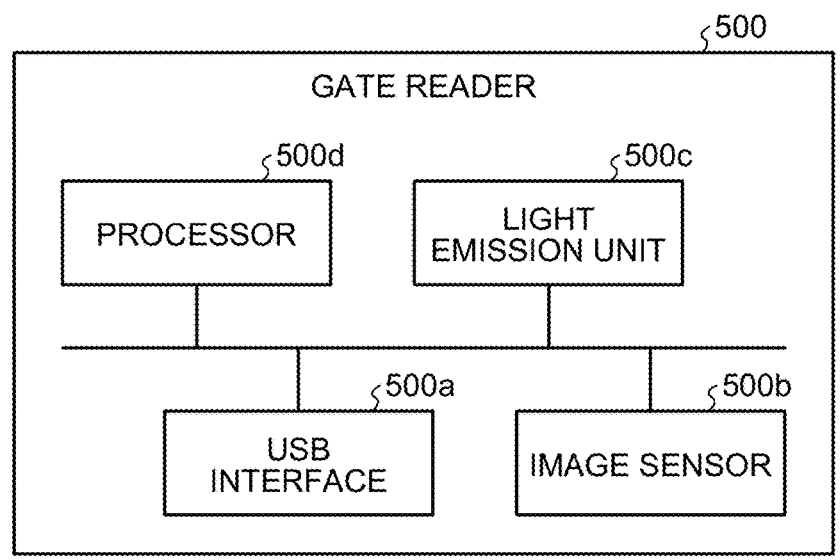
FIG. 23 is a diagram for describing a hardware configuration example of a gate reader 500.

FIG. 23 is a diagram for describing a hardware configuration example of the gate reader 500. As illustrated in FIG. 23, the gate reader 500 includes a USB interface 500*a*, an image sensor 500*b*, a light emission unit 500*c*, and a processor 500*d*. Furthermore, the units illustrated in FIG. 23 are connected mutually via a bus or the like.

The USB interface 500*a* communicates with other information processing devices.

The image sensor 500*b* receives light emitted or reflected by the target to be read by the gate reader 500, and converts the brightness of the light into electrical information.

The light emission unit 500*c* is an illumination light source such as a high-luminance LED that emits light to the target to be read by the gate reader 500 to make it easier to read. When the target to be read by the gate reader 500 or a device or the like displaying the target emits light, the gate reader 500 does not need to have the light emission unit 500*c*.

The processor 500*d* controls the light emission unit 500*c* to emit light to the target, and controls the image sensor 500*b* to convert the target into electrical information for reading. Furthermore, the processor 500*d* transmits the read electrical information of the target to other information processing devices via the USB interface 500*a*.

According to one aspect, it is possible to more accurately estimate the scale of a person from captured images.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A non-transitory computer-readable recording medium having stored therein an estimation program that causes a computer to execute a process comprising:
   identifying a first person who uses a first cart from a plurality of first images acquired by capturing inside a store;
   generating skeleton information of the first person;
   acquiring, by using the skeleton information, a first space in which the first person who grasps a grip part of the first cart, by determining that the first person grasps the grip part, when a variance of a distance between center coordinates of a bounding box of the first person and a bounding box of the first cart in the plurality of the first images captured consecutively is equal to or less than a prescribed threshold; and
   estimating a first scale of the first person based on the first space and length information of the first cart.

2. The non-transitory computer-readable recording medium according to claim 1, wherein the estimating the first scale includes calculating an average value of first scales estimated from the plurality of first images and estimating the first scale as the average value.

3. The non-transitory computer-readable recording medium according to claim 1, wherein
the generating the skeleton information includes generating two-dimensional skeleton information of the first person, and
the process further includes transforming the two-dimensional skeleton information into three-dimensional skeleton information by using a homography transformation matrix and the first scale.

4. The non-transitory computer-readable recording medium according to claim 3, wherein the process further includes calculating the homography transformation matrix based on coordinates of prescribed different four points in a second image acquired by capturing inside the store and world coordinates corresponding to each of the four points.

5. The non-transitory computer-readable recording medium according to claim 3, wherein the transforming the two-dimensional skeleton information into the three-dimensional skeleton information includes:
transforming coordinates of prescribed two body parts in the two-dimensional skeleton information into coordinates of corresponding two body parts in the three-dimensional skeleton information by using the homography transformation matrix and the first scale; and
calculating coordinates of other body parts in the three-dimensional skeleton information by using the two-dimensional skeleton information, the coordinates of the corresponding two body parts in the three-dimensional skeleton information, and the first scale.

6. The non-transitory computer-readable recording medium according to claim 3, wherein the process further includes recognizing a prescribed behavior of the first person based on the three-dimensional skeleton information.

7. The non-transitory computer-readable recording medium according to claim 6, wherein the process further includes acquiring three-dimensional position and pose data of the first cart by inputting a partial image in a bounding box of the first cart in the plurality of first images and CAD data of the first cart into a machine learning model generated by machine learning based on a captured image of a cart and CAD data of the cart as feature values and three-dimensional position and pose data of the cart as correct labels.

8. The non-transitory computer-readable recording medium according to claim 7, wherein the recognizing the prescribed behavior includes detecting an action of putting an item into the first cart by the first person based on the three-dimensional skeleton information and the three-dimensional position and pose data of the first cart.

9. An estimation method that causes a computer to execute a process comprising:
identifying a first person who uses a first cart from a plurality of first images acquired by capturing inside a store;
generating skeleton information of the first person;
acquiring, by using the skeleton information, a first space in which the first person who grasps a grip part of the first cart, by determining that the first person grasps the grip part, when a variance of a distance between center coordinates of a bounding box of the first person and a bounding box of the first cart in the plurality of the first images captured consecutively is equal to or less than a prescribed threshold; and
estimating a first scale of the first person based on the first space and length information of the first cart, by a processor.

10. An estimation device, comprising:
a memory; and
a processor coupled to the memory and configured to:
identify a first person who uses a first cart from a plurality of first images acquired by capturing inside a store,
generate skeleton information of the first person,
acquire, by using the skeleton information, a first space in which the first person who grasps a grip part of the first cart, by determining that the first person grasps the grip part, when a variance of a distance between center coordinates of a bounding box of the first person and a bounding box of the first cart in the plurality of the first images captured consecutively is equal to or less than a prescribed threshold, and
estimate a first scale of the first person based on the first space and length information of the first cart.

11. The estimation device according to claim 10, wherein the estimating the first scale executed by the processor includes calculating an average value of first scales estimated from the plurality of first images and estimating the first scale as the average value.

12. The estimation device according to claim 10, wherein the generating the skeleton information includes generating two-dimensional skeleton information of the first person, and
the processor configured to transform the two-dimensional skeleton information into three-dimensional skeleton information by using a homography transformation matrix and the first scale.

13. The estimation device according to claim 12, wherein the processor configured to calculate the homography transformation matrix based on coordinates of prescribed different four points in a second image acquired by capturing inside the store and world coordinates corresponding to each of the four points.

14. The estimation device according to claim 12, wherein the transforming the two-dimensional skeleton information into the three-dimensional skeleton information includes:
transforming coordinates of prescribed two body parts in the two-dimensional skeleton information into coordinates of corresponding two body parts in the three-dimensional skeleton information by using the homography transformation matrix and the first scale; and
calculating coordinates of other body parts in the three-dimensional skeleton information by using the two-dimensional skeleton information, the coordinates of the corresponding two body parts in the three-dimensional skeleton information, and the first scale.

15. The estimation device according to claim 10, wherein the processor configured to recognize a prescribed behavior of the first person based on the three-dimensional skeleton information.

16. The estimation device according to claim 15, wherein the processor configured to acquire three-dimensional position and pose data of the first cart by inputting a partial image in a bounding box of the first cart in the plurality of first images and CAD data of the first cart into a machine learning model generated by machine learning based on a captured image of a cart and CAD data of the cart as feature values and three-dimensional position and pose data of the cart as correct labels.

17. The estimation device according to claim 16, wherein the recognizing the prescribed behavior includes detecting an action of putting an item into the first cart by the first person based on the three-dimensional skeleton information and the three-dimensional position and pose data of the first cart.

\* \* \* \* \*